United States Patent
Palanisamy

(10) Patent No.: US 9,476,325 B2
(45) Date of Patent: Oct. 25, 2016

(54) METHOD AND APPARATUS OF PRODUCING AND UTILIZING THERMAL ENERGY IN A COMBINED HEAT AND POWER PLANT

(76) Inventor: Krishna Moorthy Palanisamy, Selangor (MY)

(*) Notice: Subject to any disclaimer, the term of this patent is extended or adjusted under 35 U.S.C. 154(b) by 388 days.

(21) Appl. No.: 14/117,847

(22) PCT Filed: Feb. 3, 2012

(86) PCT No.: PCT/MY2012/000022
§ 371 (c)(1),
(2), (4) Date: Apr. 4, 2014

(87) PCT Pub. No.: WO2012/108757
PCT Pub. Date: Aug. 16, 2012

(65) Prior Publication Data
US 2014/0208752 A1    Jul. 31, 2014

(30) Foreign Application Priority Data

Feb. 7, 2011 (MY) .......................... PI 2011000551
Apr. 19, 2011 (MY) .......................... PI 2011001755

(51) Int. Cl.
| | |
|---|---|
| *F01K 3/08* | (2006.01) |
| *F01K 23/04* | (2006.01) |
| *F01K 3/00* | (2006.01) |
| *F01K 3/26* | (2006.01) |
| *F01K 17/02* | (2006.01) |

(52) U.S. Cl.
CPC .................. *F01K 3/08* (2013.01); *F01K 3/004* (2013.01); *F01K 3/262* (2013.01); *F01K 23/04* (2013.01); *F01K 17/02* (2013.01); *Y02E 20/14* (2013.01); *Y02P 80/15* (2015.11)

(58) Field of Classification Search
CPC .......... F01K 3/08; F01K 17/02; F01K 23/04; F01K 3/004; F01K 3/262; Y02E 20/14
USPC ................. 60/648, 654, 655, 670, 685, 694
See application file for complete search history.

(56) References Cited

U.S. PATENT DOCUMENTS

| | | | | |
|---|---|---|---|---|
| 3,129,564 A | * | 4/1964 | Brunner .......................... | 60/659 |
| 3,803,846 A | * | 4/1974 | Letvin ............................. | 60/685 |
| 4,003,786 A | * | 1/1977 | Cahn .............................. | 376/322 |
| 5,829,255 A | * | 11/1998 | Sitnyakovsky et al. ......... | 60/688 |
| 7,010,920 B2 | * | 3/2006 | Saranchuk et al. ............. | 60/670 |

* cited by examiner

*Primary Examiner* — Hoang Nguyen
(74) *Attorney, Agent, or Firm* — Rahman LLC

(57) ABSTRACT

Method and apparatus for operating a combined heat and power system with greater flexibility, reliability, control and stability, for providing operational flexibility and energy efficiency in operating a combined heat and power plant which includes a backpressure steam engine that expands a high temperature heat source of a thermodynamic fluid to generate mechanical power and discharge its spent heat for a beneficial use comprises a vessel subsystem for the spent heat, said vessel subsystem including: at least one main indirect heat exchange device or vessel (7) in heat exchange communication between its primary space (10) and its secondary space (11). The present invention also discloses the use of a method and apparatus to operate a combined heat and power system.

67 Claims, 10 Drawing Sheets

Figure 1 – Sustained Cyclic Thermal Imbalance

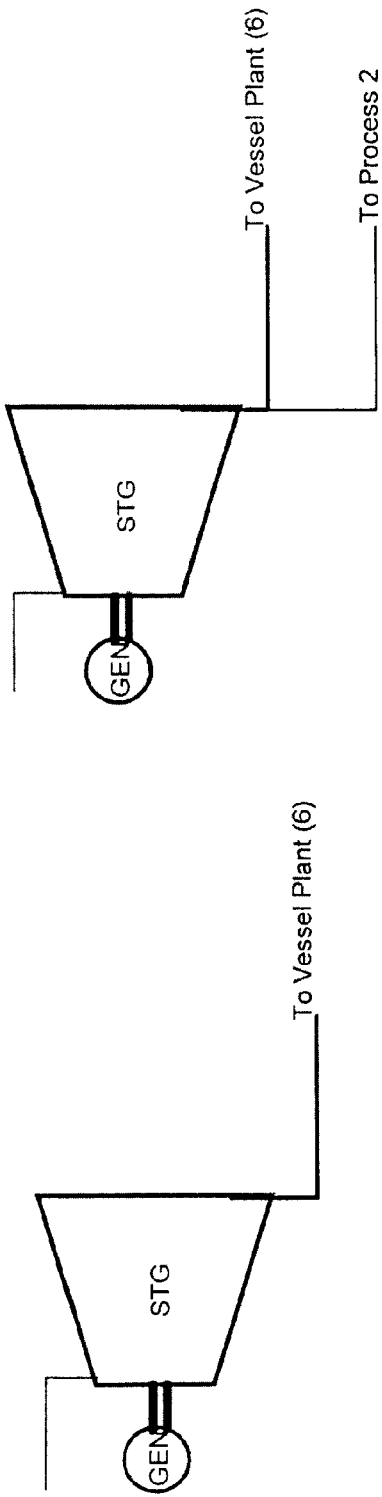
Figure 6.1 – Straight Backpressure Turbine
Figure 6.2 – Straight Backpressure Turbine
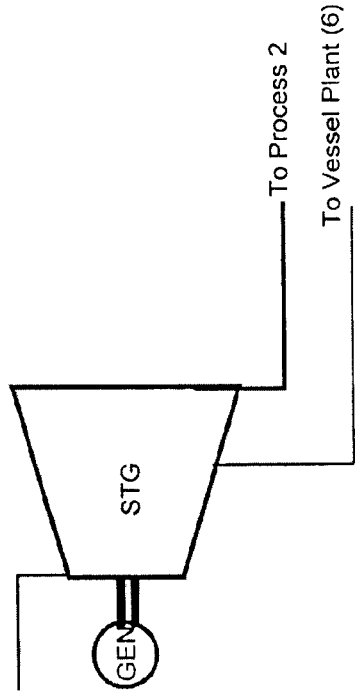
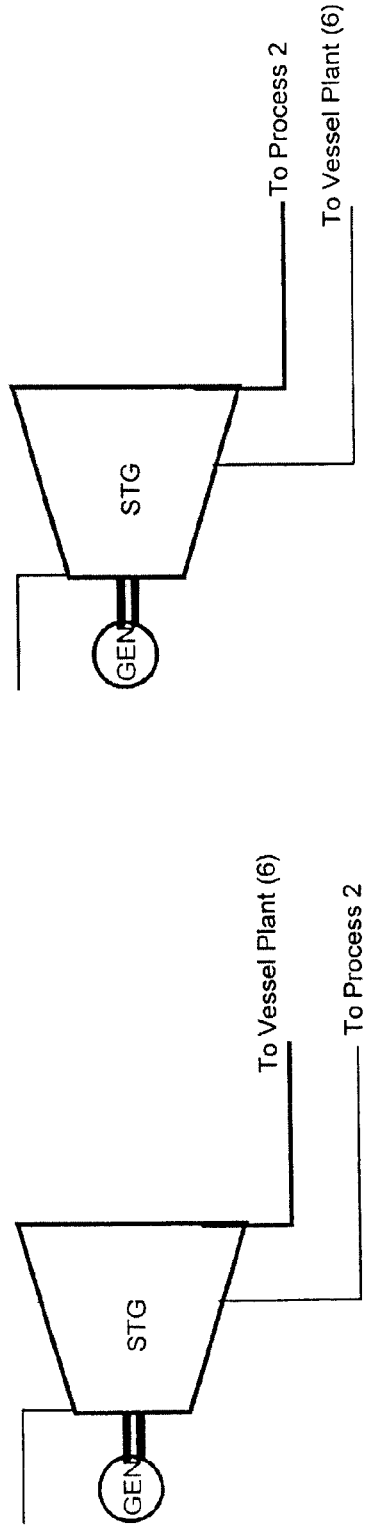
Figure 6.3 – Extraction Backpressure Turbine
Figure 6.4 – Extraction backpressure Turbine

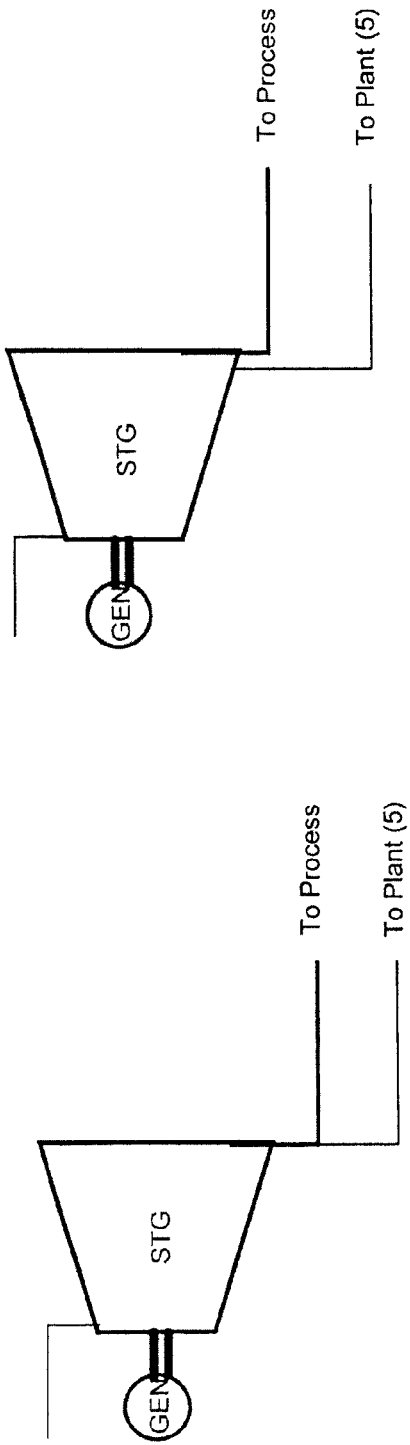
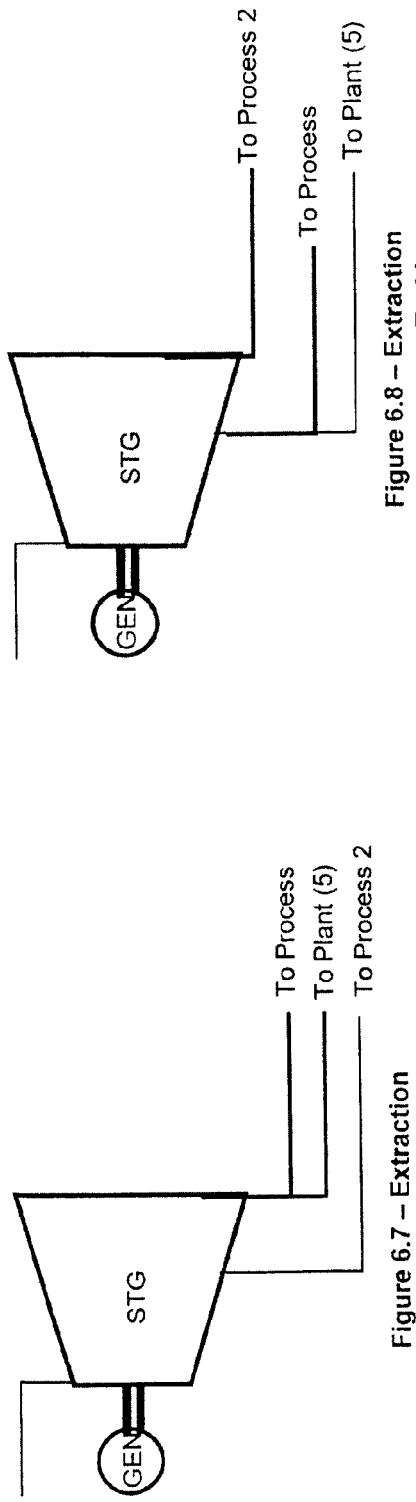

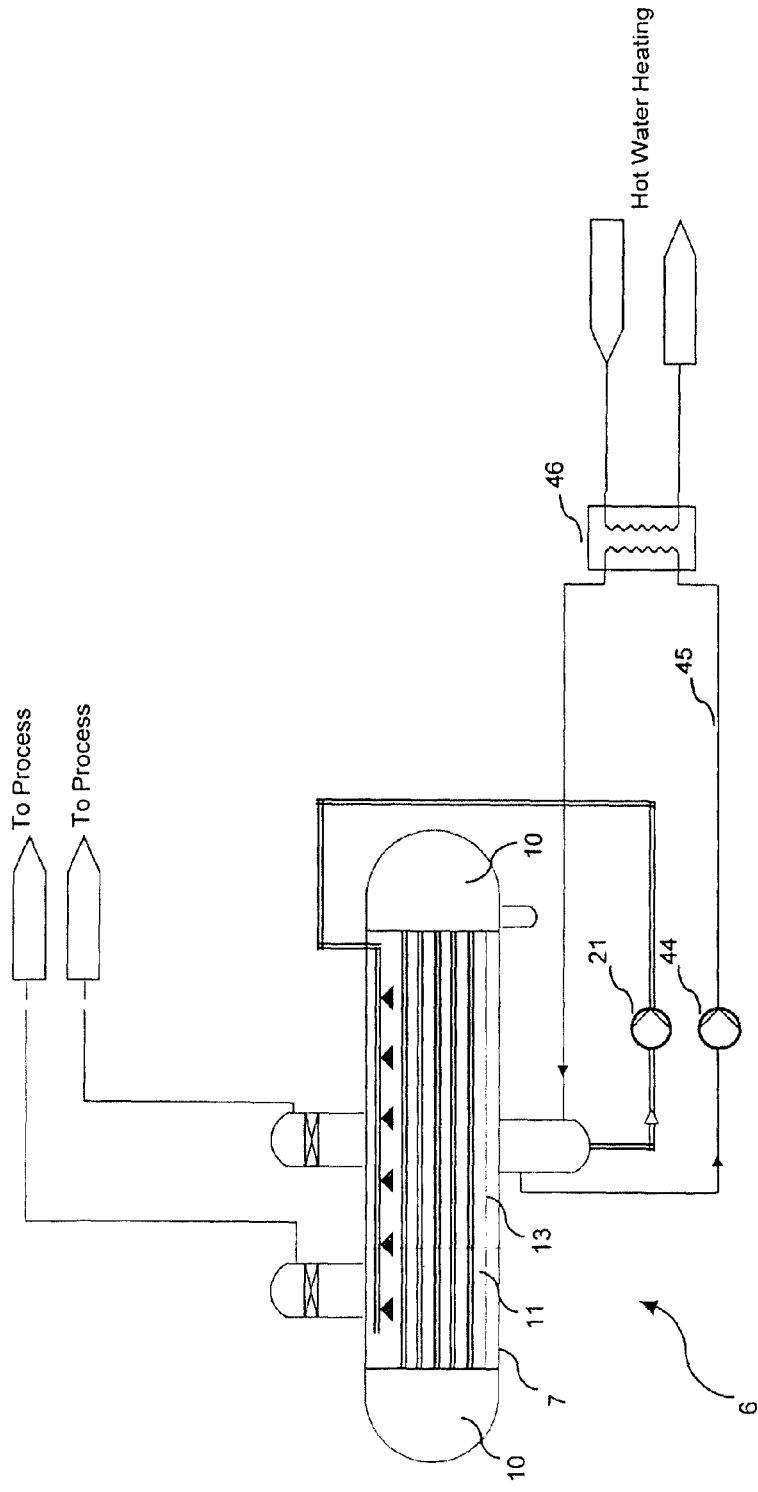
Figure 7a – Hot Water Heating Service

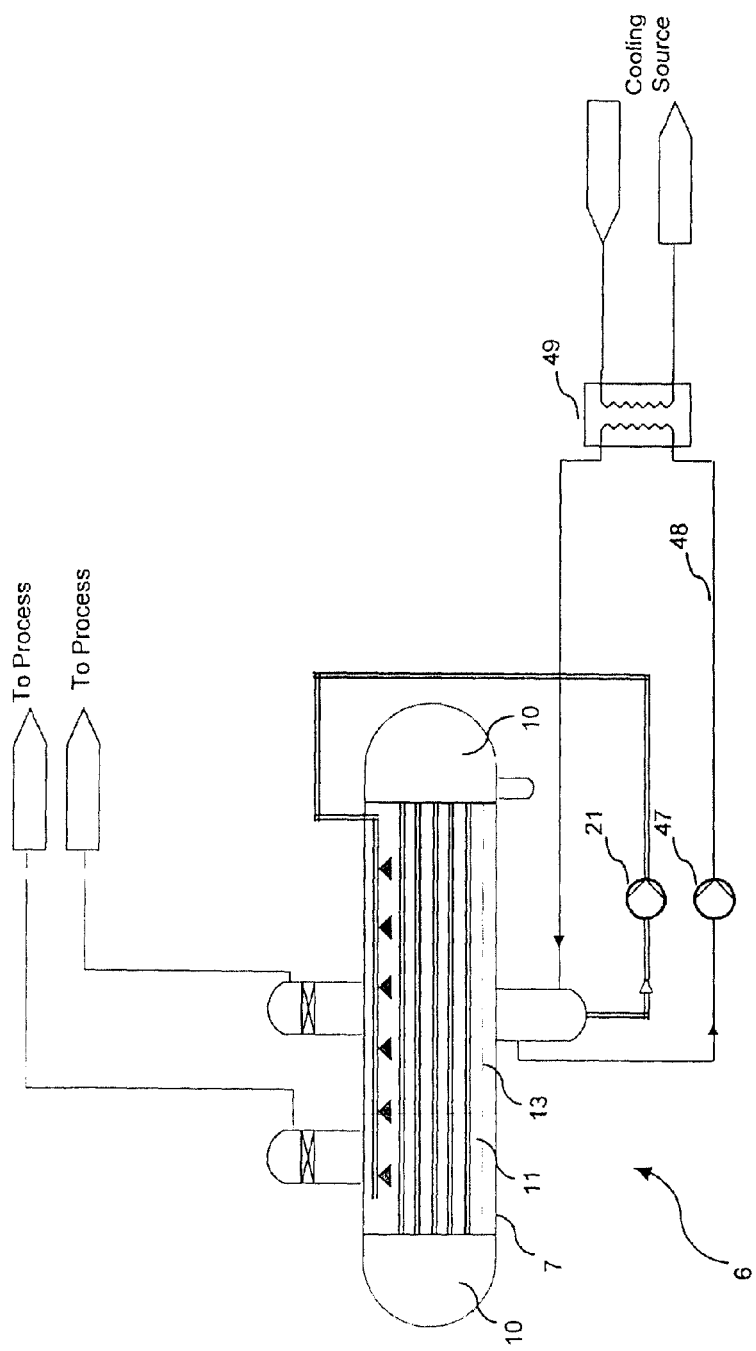
Figure 7b – External Heat Sink (river water, cooling tower, etc)

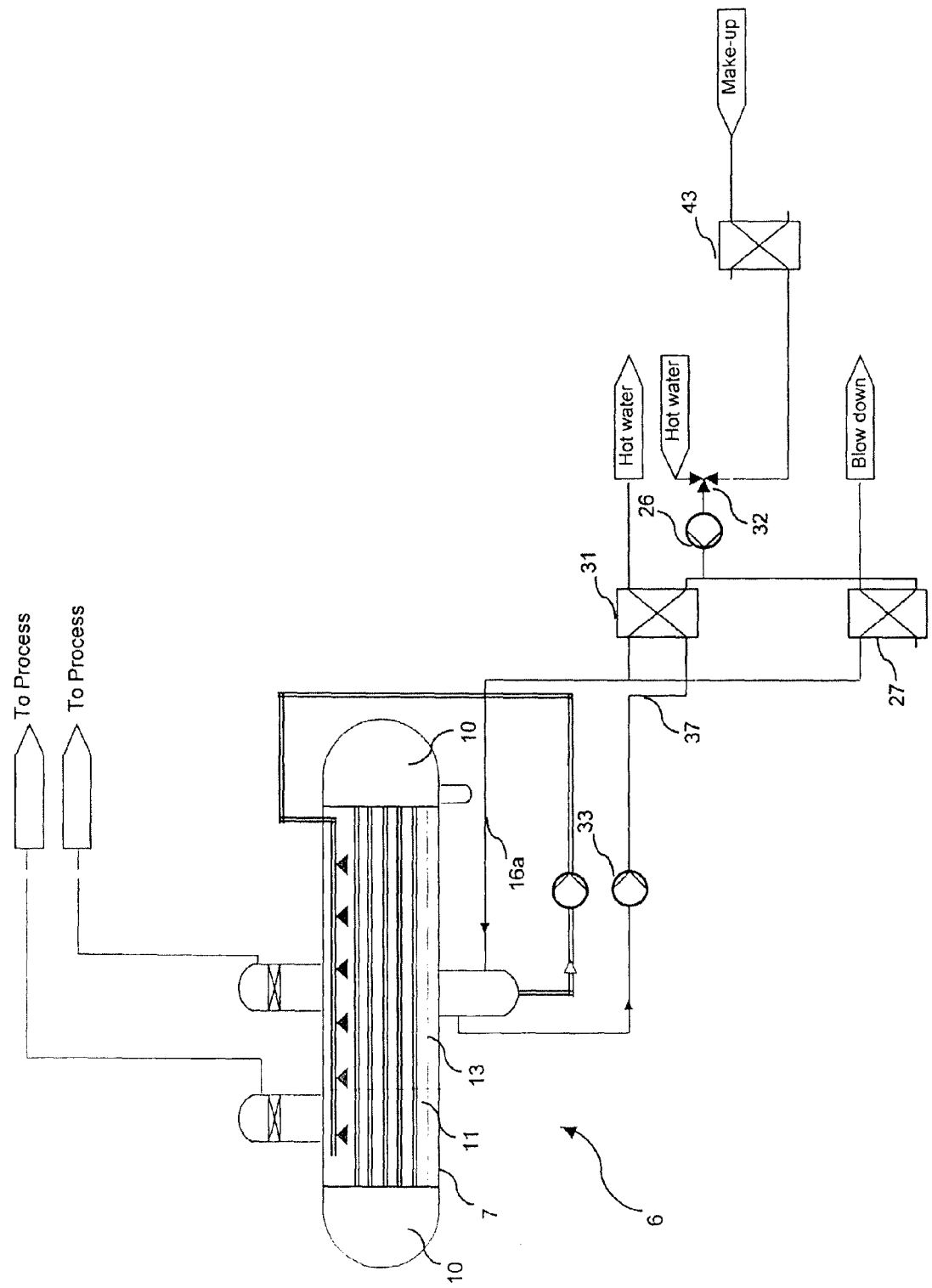
Figure 7c – Low Grade Waste Heat Recovery

METHOD AND APPARATUS OF PRODUCING AND UTILIZING THERMAL ENERGY IN A COMBINED HEAT AND POWER PLANT

CROSS-REFERENCE TO RELATED APPLICATIONS

This application is the U.S. national stage application under 35 U.S.C. §371 of International Patent Application No. PCT/MY2012/000022, filed on Feb. 3, 2012, which claims priority to Malaysian Application No. PI 2011000551, filed on Feb. 7, 2011 and Malaysian Application No. PI 2011001755, filed on Apr. 19, 2011, which are incorporated herein by reference in their entirety

FIELD OF THE INVENTION

The present invention relates to method and apparatus of producing and utilizing thermal energy in a combined heat and power plant.

BACKGROUND

Many Combined Heat and Power (CHP) systems also known as cogeneration are installed and operating in different process industries to provide electrical power and thermal energy. One of the most common versions uses a steam turbine to output mechanical shaft power that drives an electrical generator to produce electricity. Concurrently, during this mechanical power generation, the spent heat from the steam turbine exhaust is supplied as thermal energy either directly in the form of steam or hot water or hot air for a beneficial use. The thermal energy can be used for a myriad of applications, including process heating and for cooling applications using an absorption chiller.

Tied to the above, there are two typical scenarios of operation which can lead to operational inflexibility, wastage of energy and reduction of system efficiency, and therefore need to be addressed, viz:

a. Where the electrical generator is operated standalone and not paralleled with the utility grid, the primary control will be to maintain voltage and frequency where the electrical power output is matched with the electric load. This then determines the fluctuations in the quantity of thermal output as well as any excess or deficiency in thermal output to be compensated for. Conversely, vastly fluctuating thermal loads could occur, for example, when the thermal output is used for batch heating process systems or when the process is shutdown unscheduled. In the presence of the said such fluctuating thermal loads, a need then arises to regulate the heat supply to the thermal system and this is taken care of by installing a secondary control. If a deficiency in the process steam supply occurs, this is tackled by installing a steam bypass-reducing de-superheating system with high pressure steam source. If there is any surplus steam produced by the system, this is vented to the atmosphere or bypassed to a dump condenser and the condensate returned to the power circuit. Herein is where energy wastage occurs and system efficiency is reduced.

b. In contrast to (a) above, there may be cases where the electrical generator is not operated standalone, i.e. the electrical generator is operated connected to a grid. Here the primary control will be to control the exhaust steam pressure. The process steam demand dictates the electrical power of the turbine generator and any surplus or deficiency in exhaust steam supply is made up by adjusting the power flow to the grid. This necessitates the turbine drifting away from the design operation point of maximum efficiency. Sometimes the process steam demand may drop drastically for short periods in which event excess steam will be vented to the atmosphere or bypassed to a dump condenser to keep the electrical power system stable or to maintain a minimum supply to the grid, but this again wastes energy reducing system efficiency.

To overcome the above shortcomings and to attain and maintain maximum efficiency in a CHP system all of the mechanical and thermal energies will need to be harnessed optimally.

The challenge in practice is to achieve efficient and economic operation irrespective of rapid and substantial changes in electrical and thermal loads. Variations in electric loads take place as various plant equipments are run up or shutdown. Simultaneously precipitous changes in thermal loads may take place as process heating plants are run up or shutdown and especially if batch processes are involved. These are common concerns among CHP plant operators that need to be addressed, necessitating the systems to be operated with precision controls, starting mechanisms, steam accumulators, and steam makeup bypasses systems to ensure the whole system functions at an optimum level. Venting off steam to the atmosphere to maintain stability is a common viability but this is a cause for a reduction in system efficiency and loss of pure water from the system. Similarly, throttling high-pressure steam to make-up for a lower pressure steam used in low-temperature heating is also an inefficient use of thermal energy.

On the demand side, heat and power demanded in a process industry varies rapidly and sporadically over a large range. Good concurrence between electric and thermal loads is desired in practice.

Efficient cogeneration systems are prized because they ensure high thermal efficiency for complete electric power and thermal load requirements, ensuring healthy bottom-lines. At design time, a CHP system is custom-tailored to strive for a balance between mechanical and thermal energy production to suit the needs of the end user plant. The system is usually configured with optimum design to cater for all operating conditions at the best economic point based on historical or predicted power and heat demand profile over a cycle.

It is imperative that cogeneration systems are operated at or near design operation point in order to ensure that overall thermal efficiency of the integrated system can be maintained at design high level. An adverse impact on the efficiency of the cogeneration system occurs when there is a change in the power-to-heat ratio which will then require an immediate response by way of either supplementary steam supply or power supply accordingly. Good concurrence between electric and thermal loads helps to limit energy losses. Operational flexibility in terms of the ability to adjust the system operation in quick response to changes in power or thermal energy demand without significantly sacrificing overall efficiency is much desired.

Where there is rapid and erratic variation of the process heat demand and this is left uncontrolled this could lead to consequential effects that ripple through to the boiler operation. Erratic load on the boiler causes undue stress that may reduce its useful life span. A steady state operation of the CHP plant is desired to not only extend life span of the boiler but also to help to maintain high combustion efficiencies and reduce air pollutant emission wherever a boiler supplies the primary heat to the system. Commonly boilers having an excess capacity are installed to ensure peak demand is met well within the capacity of the fired boiler. By reducing steam demand fluctuations on the boiler, the boiler steam drum size can be reduced for a given production capacity. This is an important factor to consider as the boiler operating pressures increase, because the cost of constructing and installing steam drums increases more than proportionally with boiler operating pressure increase.

In prior art, in order to maintain the required power or heat during these load changes (power-to-heat ratio balancing), either high pressure steam from the boiler is used to make up any deficiency in the process steam requirement or surplus steam is vented to the atmosphere or bypassed to a dump condenser and the condensate is returned to the power circuit. These are causes of potential thermal energy loss and corresponding fluid loses from the system. Further, dump condensers need a cooling source which can be a once-through circulating water or chilled water from a cooling tower, both of which require additional water source(s) and auxiliary power to keep them in standby operation.

It is therefore desired to seek an alternative solution that is both energy-efficient and water-saving and yet at the same time offers greater operational reliability and flexibility.

SUMMARY OF THE INVENTION

In one aspect this invention relates to a method of producing and utilizing thermal energy in a combined heat and power plant including the steps of:
a. generating a flow of steam in a steam generator from a flow of feed water;
b. directing a generated flow of steam from a steam generator into a steam engine to produce mechanical power and discharging a flow of exhaust steam from the steam engine;
c. directing either a flow of exhaust steam from the steam engine or a flow comprising a combination of an exhaust steam from the steam engine and supplementary steam from a steam generator as process steam to provide thermal energy for a downstream process; characterised in that the method further includes the steps of:
d. in at least a vessel, wherein the vessel includes a primary space and a secondary space in heat communication with but with fluid separation from each other, said secondary space contains a quantity of a secondary fluid in liquid phase,
   introducing the flow of process steam in step (c) into the primary space as primary steam to vaporize
   simultaneously introducing the secondary fluid in liquid phase as make-up fluid into the secondary space resulting in precipitation of the primary steam as a primary condensate
   directing the vaporized secondary fluid from step (c) to impart thermal energy for the downstream process
   whilst delivering the primary condensate from the primary space.
e. during periods of surplus vaporized secondary fluid directed to the downstream process, increasing flow rate of introduction of the make-up fluid into the secondary space, thus reducing the output of the vaporized secondary fluid in step (d) and accumulating a transitionally confined reserve quantity of the secondary fluid in liquid phase in a heated state in a reservoir space of the secondary space, and during periods of deficit vaporized secondary fluid directed to the downstream process, decreasing flow rate of introduction of the make-up fluid into the secondary space, thus increasing the output of the vaporized secondary fluid in step (d) and depleting the transitionally confined reserve quantity of the secondary fluid in liquid phase in a heated state in the reservoir space of the secondary space by continued vaporization;
f. delivering the primary condensate of step (d) back to the steam generator as a flow of feed water.

The temperature of the make-up fluid is lower than the temperature of the vaporized secondary fluid. The make-up fluid introduced into the secondary space does not comprise thermal energy gained from the primary condensate. A maximum flow rate of the make-up fluid during introduction of make up fluid into the secondary space is not less than 1.3 times the flow rate of required make-up fluid flow for the maximum continuous rated evaporative capacity of the vessel. A pressure in the primary space and a pressure in the secondary space are greater than atmospheric pressure. The secondary fluid in the secondary space is maintained at substantially constant pressure and temperature. The generation of the vaporized secondary fluid includes a thin-film evaporation process. The thin film evaporation process includes circulating the secondary fluid in the secondary space by drawing the secondary fluid in liquid phase and discharging it on a surface heated by the primary stream.

In another embodiment, the method further includes the step of: preheating the make-up fluid in at least one feed water heater using the vaporized secondary fluid and subsequently discharging the preheated make-up fluid into the secondary space.

At least one feed water heater is configured to remove non-condensable gases from the make-up fluid and subsequently discharge the treated make-up fluid into the secondary space.

In another embodiment, the method further includes the step of: withdrawing at least a portion of the vaporized secondary fluid into an at least one auxiliary steam condenser configured to precipitate the vaporized secondary fluid as a secondary condensate and discharging the secondary condensate into the secondary space, wherein a thermal energy in the secondary space is dispersed to the open.

In another embodiment, the method further includes the step of: drawing the secondary condensate from the auxiliary steam condenser, and delivering the secondary condensate as a make-up condensate for the steam generator.

In another embodiment, the method further includes the step of: during periods of surplus vaporized secondary fluid directed to the downstream process, withdrawing hot secondary fluid in liquid phase from the secondary space of vessel to an external thermal energy storage facility; and replacing the same quantity of secondary fluid, which is withdrawn in this way with the make-up fluid into the secondary space, thus reducing the surplus thermal energy output from the secondary space, and during periods of deficit vaporized secondary fluid directed to the downstream process, introducing hot make-up fluid into the secondary space from the external thermal energy storage facility, thus reducing the deficit thermal energy output from the secondary space.

In another embodiment, the method further includes the step of: selectively increasing or decreasing the introduction of make-up fluid into the secondary space of vessel in response to a positive or negative pressure deviation from a predetermined set-point pressure respectively of the vaporized secondary fluid, in order to regulate the pressure of the vaporized secondary fluid, wherein the pressure of the vaporized secondary fluid is maintained substantially at the set-point pressure; and selectively decreasing or increasing the input of primary steam into the primary space in response to a rising or falling liquid surface level in the secondary space from a predetermined surface level respectively in order to regulate the liquid surface level in the secondary space, wherein the rise or fall of liquid surface level from a predetermined surface level is gradually restrained.

In another embodiment, the method further includes the step of: determining the flow rate (R1) of vaporized secondary fluid output from the secondary space by measuring the flow rate (R2) of the primary steam flowing into the primary space and measuring the flow rate (R3) of make-up fluid flowing into the secondary space, wherein $R1=a \cdot R2-b \cdot R3$ where $a=(hg_0-hf_0)/(hg_1-hf_1)$;
$b=(hf_1-hf_2)/(hg_1-hf_1)$;
and,
$hg_0$=enthalpy of primary steam drawn into primary space;
$hf_0$=enthalpy of primary condensate discharged from primary space;
$hg_1$=enthalpy of secondary fluid in vapour state;
$hf_1$=enthalpy of secondary fluid in liquid state;
$hf_2$=enthalpy of make-up water In another aspect this invention further relates to an arrangement in a combined heat and power plant more particularly in a palm oil mill to produce and utilize thermal energy including: a means to produce a flow of generated steam from a flow of feed water; a means to receive a flow of the generated steam into a steam engine to produce mechanical power and to discharge a flow of exhaust steam from the steam engine; a means to direct either a flow of exhaust steam from the steam engine or a flow comprising a combination of an exhaust steam from the steam engine and supplementary steam from a steam generator as process steam to provide thermal energy to a downstream process, characterized in that the arrangement further includes, at least a vessel wherein the said vessel includes a primary space and a secondary space in heat communication with but with fluid separation from each other, said secondary space containing a quantity of a secondary fluid in liquid phase, and the vessel configured to receive the process steam into the primary space as a primary steam which imparts a thermal energy to the secondary space resulting in precipitation of the primary steam as a primary condensate, and the vessel further includes a means of introducing a secondary fluid in liquid phase as make-up fluid into the secondary space, wherein said secondary fluid is vaporizable using the said imparted thermal energy in the secondary space, and a means to output and direct any vaporized secondary fluid to the downstream process, and a means to withdraw the primary condensate. The secondary space includes a reservoir space to hold a quantity of the secondary fluid in liquid phase; a means to vary the flow rate of make-up water into the secondary space is provided, wherein during periods of surplus vaporized secondary fluid directed to the downstream process, the flow rate of the make-up water is increased, thus reducing the output of the vaporized secondary fluid and accumulating a transitionally confined reserve quantity of the secondary fluid in liquid phase in a heated state in the reservoir space; and during periods of deficit vaporized secondary fluid directed to the downstream process, the flow rate of the make-up fluid is reduced, thus increasing the output of the vaporized secondary fluid and depleting the transitionally confined reserve quantity of the secondary fluid in liquid phase in a heated state in the reservoir space by continued vaporization. A means to deliver the withdrawn primary condensate as the flow of feed water for steam generation is provided. A means for regenerative heat transfer between the primary condensate and the make-up fluid is excluded. The vessel includes a means for a thin-film evaporative process for vaporization of the secondary fluid. The means for the thin film evaporative process includes a plurality of tubes through which tubes the primary steam is flowable, wherein secondary fluid is introducible over the external surface of the tubes. In another embodiment, the method further includes at least one feed water heater coupled in fluid communication with secondary space of the at least one vessel to preheat the make-up fluid using the vaporized secondary fluid and subsequently to discharge the preheated make-up secondary fluid into the secondary space. The feed water heater is coupled to the secondary space of the at least one vessel to receive the vaporized secondary fluid for its operation and to discharge the preheated make-up fluid into the secondary space. The at least one feed water heater is configured to preheat make-up fluid introducible into the secondary space to a temperature substantially equal to the temperature of the vaporised secondary fluid at a maximum flow rate not less than 1.3 times the flow rate of required make-up fluid flow for the maximum continuous rated evaporative capacity of the vessel. The at least one feed water heater is configured to remove non-condensable gases from the make-up fluid and subsequently to discharge the treated make-up fluid into the secondary space. In another embodiment, the arrangement further includes a means to withdraw at least a portion of the vaporized secondary fluid into an at least one auxiliary steam condenser configured to precipitate the vaporized secondary fluid as a secondary condensate and a means to discharge the secondary condensate into the secondary space, wherein a thermal energy in the secondary space is dispersed to the open.

In another embodiment, the arrangement further includes a means to withdraw a secondary condensate from the auxiliary steam condenser, and a means to deliver the secondary condensate as a make-up condensate for the steam generator. In another embodiment, the arrangement further includes a means to draw hot secondary fluid in liquid phase from the secondary space of vessel to an external thermal energy storage facility; and a means to replace the same quantity of secondary fluid, which is withdrawn in this way with make-up fluid into the secondary space during periods of surplus vaporized secondary fluid directed to the downstream process, and a means to introduce hot make-up fluid into the secondary space from the external thermal energy storage facility during periods of deficit vaporized secondary fluid directed to the downstream process. In another embodiment, the arrangement further includes: a control system comprising at least a sensor for sensing the pressure of the vaporized secondary fluid communicatively coupled to a flow controllable means located on a make-up fluid introducible circuit and operable to selectively increase or decrease the introduction of make-up fluid into the secondary space in response to a positive or negative pressure deviation from a predetermined set-point pressure respectively of the vaporized secondary fluid, in order to regulate the pressure of the vaporized secondary fluid to maintain it substantially at set-point pressure; and the control system further comprising at least a sensor for sensing the level of secondary fluid liquid surface and further operable to selectively decrease or increase the input of primary steam into the primary space of vessel in response to a rise or fall of liquid surface level in the secondary space from a predetermined surface level respectively in order to regulate the liquid surface level in the secondary space, wherein the rise or fall of liquid surface level from a predetermined surface level is gradually restrained.

In another embodiment, the arrangement further includes: A microprocessor in which a signal denoting the flow rate (R1) of the vaporized secondary fluid output flow from the secondary space is shown as output wherein a signal denoting the flow rate (R2) of the primary steam flow into the primary space and a signal denoting the flow rate (R3) of the make-up fluid flow into the secondary space which signals are input into the microprocessor, wherein R1 is computed from the formula, R1=a. R2−b. R3 where $a=(hg_0-hf_0)/(hg_1-hf_1)$;
$b=(hf_1-hf_2)/(hg_1-hf_1)$;
and,
$hg_0$=enthalpy of primary steam drawn into primary space;
$hf_0$=enthalpy of primary condensate discharged from primary space;
$hg_1$=enthalpy of secondary fluid in vapour state;
$hf_1$=enthalpy of secondary fluid in liquid state;
$hf_2$=enthalpy of make-up water This invention further relates to a vessel for fluid separation and providing thermal energy buffer capacity, said vessel includes a primary space and a secondary space in heat communication with but with fluid separation from each other, said secondary space containing a quantity of a secondary fluid in liquid phase, the vessel configured to receive a flow of steam into the primary space as a primary steam which imparts a thermal energy to the secondary space resulting in precipitation of the primary steam as a primary condensate, and the vessel further includes a means of introducing a secondary fluid in liquid phase as make-up fluid into the secondary space, wherein the secondary fluid is vaporizable using the said imparted thermal energy in the secondary space, and a means to output and direct any vaporized secondary fluid to a downstream process, and a means to withdraw the primary condensate. The secondary space includes a reservoir space to hold a quantity of the secondary fluid in liquid phase; a means to vary the flow rate of make-up water into the secondary space is provided, wherein during periods of surplus vaporized secondary fluid directed to the downstream process, the flow rate of the make-up water is increased, thus reducing the output of the vaporized secondary fluid and accumulating a transitionally confined reserve quantity of the secondary fluid in liquid phase in a heated state in the reservoir space; and during periods of deficit vaporized secondary fluid directed to the downstream process, the flow rate of the make-up fluid is reduced, thus increasing the output of the vaporized secondary fluid and depleting the transitionally confined reserve quantity of the secondary fluid in liquid phase in a heated state in the reservoir space by continued vaporization. A means for regenerative heat transfer between the primary condensate and the make-up fluid is excluded. The vessel includes a means for a thin-film evaporative process for vaporization of said secondary fluid. The means for the thin-film evaporative process includes a plurality of tubes through which tubes the primary steam is flowable, wherein secondary fluid is introducible over the external surface of the tubes.

In another embodiment, the vessel further includes at least one feed water heater coupled in fluid communication with secondary space of the vessel to preheat the make-up fluid using the vaporized secondary fluid and subsequently to discharge the preheated make-up secondary fluid into the secondary space. The feed water heater is coupled to the secondary space of the vessel to receive the vaporized secondary fluid for its operation and to discharge the preheated make-up fluid into the secondary space. The at least one feed water heater is configured to preheat make-up fluid introducible into the secondary space to a temperature substantially equal to the temperature of the vaporised secondary fluid at a maximum flow rate not less than 1.3 times the flow rate of required make-up fluid flow for the maximum continuous rated evaporative capacity of the vessel. The at least one feed water heater is configured to remove non-condensable gases from the make-up fluid and subsequently to discharge the treated make-up fluid into the secondary space.

In another embodiment, the vessel further includes a means to withdraw at least a portion of the vaporized secondary fluid into an at least one auxiliary steam condenser configured to precipitate the vaporized secondary fluid as a secondary condensate and a means to discharge the secondary condensate into the secondary space, wherein a thermal energy in the secondary space is dispersed to the open.

In another embodiment, the vessel further includes a means to draw hot secondary fluid in liquid phase from the secondary space of vessel to an external thermal energy storage facility; and a means to replace the same quantity of secondary fluid, which is withdrawn in this way with make-up fluid into the secondary space during periods of surplus vaporized secondary fluid directed to the downstream process, and a means to introduce hot make-up fluid into the secondary space from the external thermal energy storage facility during periods of deficit vaporized secondary fluid directed to the downstream process.

In another embodiment, the vessel further includes: a control system comprising at least a sensor for sensing the pressure of the vaporised secondary fluid communicatively coupled to a flow controllable means located on a make-up fluid introducible circuit and operable to selectively increase or decrease the introduction of make-up fluid into the secondary space in response to a positive or negative pressure deviation from a predetermined set-point pressure respectively of the vaporized secondary fluid, in order to regulate the pressure of the vaporized secondary fluid to maintain it substantially at set-point pressure; and the control system further comprising at least a sensor for sensing the level of secondary fluid liquid surface and further operable to selectively decrease or increase the input of primary steam into the primary space of vessel in response to a rise or fall of liquid surface level in the secondary space from a predetermined surface level respectively in order to regulate the liquid surface level in the secondary space, wherein the rise or fall of liquid surface level from a predetermined surface level is gradually restrained.

In another embodiment, the vessel further includes: a microprocessor in which a signal denoting the flow rate (R1) of the vaporized secondary fluid output flow from the secondary space is shown as output wherein a signal denoting the flow rate (R2) of the primary steam flow into the primary space and a signal denoting the flow rate (R3) of the make-up fluid flow into the secondary space which signals are input into the microprocessor, wherein R1 is computed from the formula, R1=a. R2−b. R3 where $a=(hg_0-hf_0)/(hg_1-hf_1)$;
$b=(hf_1-hf_2)/(hg_1-hf_1)$;
and,
$hg_0$=enthalpy of primary steam drawn into primary space;

$hf_0$=enthalpy of primary condensate discharged from primary space;
$hg_1$=enthalpy of secondary fluid in vapour state;
$hf_1$=enthalpy of secondary fluid in liquid state;
$hf_2$=enthalpy of make-up water In another aspect this invention further relates to a method of producing and utilizing thermal energy in a palm oil mill including the steps of:

a. generating a flow of steam in a steam generator from a flow of feed water;
b. directing the flow of steam from the steam generator into a steam engine to produce mechanical power and discharging exhaust steam from the steam engine;
c. directing either a flow of exhaust steam from the steam engine or a flow comprising a combination exhaust steam from the steam engine and supplementary steam from a steam generator as process steam for a downstream process;
d. directing a portion of the exhaust steam at a pressure not lower than the pressure of the process steam as heating steam for heating a make-up water introducible into at least one storage vessel, confining the heated make-up water transitionally in the at least one storage vessel, removing the confined hot water from the storage vessel and applying the hot water for a beneficial use; and wherein the temperature of the make-up water introduced into the storage vessel is lower than the saturation temperature of the exhaust steam used for heating the make-up water characterised in that the method further includes the steps of:
e. during periods of surplus flow of process steam in step (c), increasing the introduction of make-up water for heating, thus reducing the surplus flow of process steam in step (c) and accumulating a transitionally confined reserve quantity of the hot water in the storage vessel, and during periods of deficit flow of process steam in step (c), reducing the introduction of the make-up water for heating, thus reducing the deficit flow of process steam in step (c) and depleting the transitionally confined reserve quantity of the hot water in the storage vessel by continuing to supply a flow of hot water for the beneficial use.

The hot water is heated and maintained at substantially constant pressure and temperature. The hot water is heated to a temperature substantially equal to the saturation temperature of the heating steam used for heating the make-up water. The process steam is used for heating the make-up water. The beneficial use comprises flow of feed water to the steam generator. A maximum flow rate of the make-up water during introduction of make up water into the storage vessel is not less than 1.3 times the flow rate of required make-up water flow for the maximum continuous rated supply of hot water for the beneficial use.

In another embodiment, the method further includes the step of: preheating the make-up fluid in at least one feed water heater coupled in fluid communication with the at least one storage vessel using the heating steam and subsequently discharging the preheated make-up water into the storage vessel. The at least one feed water heater is configured to remove non-condensable gases from the make-up water and subsequently discharge the treated make-up water into the storage vessel.

In another embodiment, the method further includes the step of: during periods of surplus flow of process steam, withdrawing hot water from the storage vessel to an external thermal energy storage facility; and replacing the same quantity of water, which is withdrawn in this way with make-up water into the feed water heater, thus reducing the surplus flow of process steam, and during periods of deficit flow of process steam, introducing hot make-up water into the feed water heater from the external thermal energy storage facility, thus reducing the deficit flow of process steam.

In another embodiment, the method further includes the step of: selectively increasing or decreasing the introduction of make-up water for heating into the storage vessel in response to a positive or negative pressure deviation from a predetermined set-point pressure respectively of process steam, in order to regulate the pressure of process steam, wherein the pressure of the process steam is maintained substantially at the set-point pressure; and selectively decreasing or increasing the output of process steam in step (c) to the downstream process in response to a rising or falling liquid surface level in the storage vessel from a predetermined surface level respectively, in order to regulate the liquid surface level, wherein the rise or fall of liquid surface level in the storage vessel from a predetermined surface level is gradually restrained.

In another embodiment, the method further includes the step of: determining the flow rate (R1) of process steam to a downstream process by measuring the flow rate (R2) of flow of exhaust steam and measuring the flow rate (R3) of flow rate of make-up water into the storage vessel, wherein R1=R2−a. R3 where $a=(hf_1-hf_2)/(hg_0-hf_1)$;
and,
$hg_0$=enthalpy of a flow of exhaust steam;
$hf_1$=enthalpy of heated water in storage vessel;
$hf_2$=enthalpy of make-up water This invention further relates to an arrangement in a palm oil mill to produce and utilize thermal energy including a means to produce a flow of steam in a steam generator from a flow of feed water; a means to receive a flow of steam into a steam engine to produce mechanical power and to discharge the exhaust steam from the steam engine; a means to direct either a flow of exhaust steam from the steam engine or a flow comprising a combination of an exhaust steam from the steam engine and supplementary steam from a steam generator as process steam for a downstream process, a means to direct a portion of the exhaust steam at a pressure not lower than the pressure of the process steam as heating steam for heating a make-up water introducible into at least one storage vessel, to confine the heated make-up water transitionally in the at least one storage vessel, to remove the confined hot water from the storage vessel and to apply the hot water for a beneficial use; and wherein the temperature of the make-up water introduced into the storage vessel is lower than the saturation temperature of the heating steam used for heating the make-up water, characterized in that the arrangement further includes a means to vary the flow rate of make-up water into the storage vessel, wherein during periods of surplus process steam directed to the downstream process, the flow rate of the make-up water is increased, thus reducing the output of the process steam and accumulating a transitionally confined reserve quantity of hot water in the storage vessel; and during periods of deficit process steam directed to the downstream process, the flow rate of the make-up water is reduced, thus increasing the output of the process steam and depleting the transitionally confined reserve quantity of the hot water in the storage vessel by continuing to supply a flow of hot water for the beneficial use. The hot water is heated and maintained at substantially constant pressure and temperature. The process steam supplies the heating steam. The hot water is heated to a temperature substantially equal to saturation temperature of the heating steam. The beneficial use comprises flow of feed water to the steam generator In another embodiment, the arrangement further includes at least one feed water heater coupled in fluid communication with the at least one storage vessel to preheat the make-up water using the heating steam and subsequently to discharge the preheated make-up water into the storage vessel. The at least one feed water heater is coupled to the storage vessel to discharge the preheated make-up water into the storage vessel. The at least one feed water heater is configured to preheat the make-up water to a temperature substantially equal to saturation temperature of the heating steam at a maximum flow rate not less than 1.3 times the flow rate of required make-up water flow for the maximum continuous rated supply of hot water for the beneficial use. The at least one feed water heater is configured to remove non-condensable gases from the make-up water and subsequently discharge the treated make-up water into the storage vessel.

In another embodiment, the arrangement further includes a means to withdraw hot water from the storage vessel to an external thermal energy storage facility during periods of surplus flow of the process steam to the downstream process; and a means to replace the same quantity of water, which is withdrawn in this way with make-up water into the feed water heater, and a means to introduce hot make-up water into the feed water heater from the external thermal energy storage facility during periods of deficit flow of the process steam.

In yet another embodiment, the arrangement further includes a control system comprising at least a sensor for sensing the pressure of the process steam which sensor is communicatively coupled to a flow controllable means located on a make-up circuit and operable to selectively increase or decrease the introduction of make-up water for heating into the storage vessel in response to a positive or negative pressure deviation from a predetermined set-point pressure respectively of the process steam, in order to regulate the pressure of the process steam, wherein the pressure of the process steam is maintained substantially at the set-point pressure; and the control system further includes at least a sensor for sensing the level of hot water in the storage vessel and is operable to selectively decrease or increase the output of process steam to the downstream process in response to a rise or fall of hot water surface level in the storage vessel from a predetermined surface level respectively, in order to regulate the hot water surface level, wherein the rise or fall of hot water surface level in the storage vessel from a predetermined surface level is gradually restrained.

In another embodiment, the arrangement further includes: a microprocessor in which a signal denotes the flow rate (R1) of the process to a downstream process is shown as output wherein a signal denoting the flow rate (R2) of the flow of exhaust steam discharged by the steam engine and a signal denoting the flow rate (R3) of flow of make-up rate into the storage vessel which signals are input into the microprocessor, wherein R1 is computed from the formula, R1=R2−a. R3 where $a=(hf_1-hf_2)/(hg_0-hf_1)$;
and,
$hg_0$=enthalpy of the flow of exhaust steam;
$hf_1$=enthalpy of heated water in storage vessel;
$hf_2$=enthalpy of make-up water

BRIEF DESCRIPTION OF THE DRAWINGS

The above mentioned attributes and other features and advantages of this invention and the manner of attaining them, will become more apparent and the invention itself will be better understood by reference to the following description of embodiments of the invention taken in conjunction with the accompanying drawings, wherein:

FIGS. 6.1 and 6.2 show sections of arrangements of a combined heat and power system used in a palm oil mill extraction plant relating to vessel plant (6) in fourth and fifth embodiments, respectively, of the present invention.

FIGS. 6.3 and 6.4 show sections of arrangements of a combined heat and power system used in a palm oil mill extraction plant relating to vessel plant (6) in sixth and seventh embodiments, respectively, of the present invention.

FIGS. 6.5 and 6.6 show sections of arrangements of a combined heat and power system used in a palm oil mill extraction plant relating to plant (5) in first and eight embodiments, respectively, of the present invention.

FIGS. 6.7 and 6.8 show sections of arrangements of a combined heat and power system used in a palm oil mill extraction plant relating to plant (5) in ninth and tenth embodiments, respectively, of the present invention.

FIG. 7a shows a schematic diagram of the present invention indicating an additional option for providing hot water heating service for external process in any of the embodiment of the present invention as shown in FIGS. 1 to 6.4.

FIG. 7b shows a schematic diagram of the present invention indicating an additional option for incorporating external heat sink to remove excess heat from the vessel by means like river water or cooling tower in any of the embodiment of the present invention as shown in FIGS. 1 to 6.4.

FIG. 7c shows a schematic diagram of the present invention indicating an option for incorporating low grade waste heat recovery in any of the embodiment of the present invention as shown in FIGS. 1 to 6.4.

Figure 1:
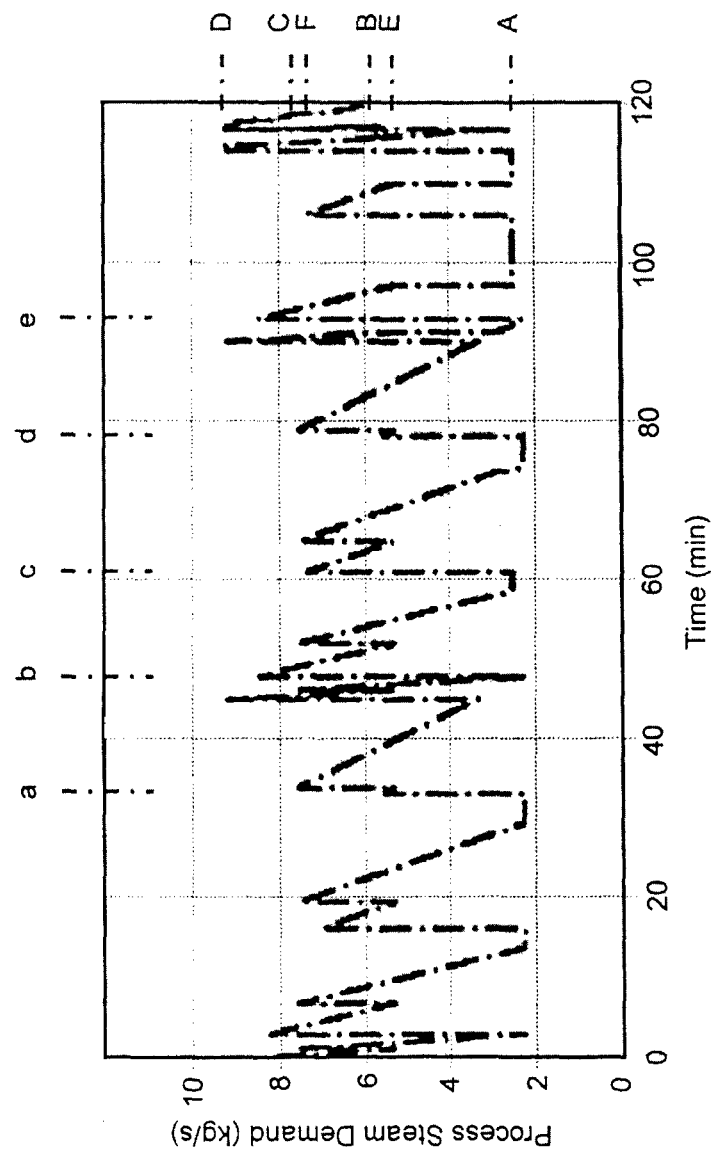
FIG. 1 shows an example of a downstream process steam load profile in a typical palm oil extraction plant that exhibits a sustained cyclic load.

A preferred embodiment of the present invention is described in detail with reference to the accompanying drawings. It is intended, however, that unless particularly specified, dimensions, material, relative positions and so forth of the constituent parts in the embodiments shall be interpreted as illustrative only and not as limitative of the scope of the present invention.

DETAILED DESCRIPTION OF THE INVENTION

The invention is directed towards offering a solution to produce and utilize thermal energy in a combined heat and power (CHP) plant, more particularly in a palm oil extraction plant (or palm oil mill) with improved operational reliability, flexibility and energy efficiency.

Certain terminology will be used this description for convenience in reference only and will not be limiting.

In this description the term "surplus steam" or "surplus vaporized secondary fluid" refers a situation where the mass flow of the fluid at the supply source to a downstream process is in excess of the mass flow of fluid at admission into the downstream process with a tendency of pressure rise in the fluid supply conduit, and the term "deficit steam" or "deficit vaporized secondary fluid" refers to a situation where the mass flow of the fluid at the supply source to a downstream process is in shortage of the mass flow of fluid at admission into the downstream process with a tendency of pressure fall in the fluid supply conduit. The term "thermal imbalance" refers to either of the above non-steady state situations.

In this description the term "vessel" refers to an indirect heat exchange device in which live steam or steam withdrawn from a steam engine exhaust (primary steam) precipitates as condensate within its primary space while the thermal energy dissipated by such condensation heats a secondary fluid such as water to generate secondary vapour, at a lower temperature within the secondary space of the heat exchange device. The secondary fluid is then supplied to an external process or processes, while the pure condensate from the primary steam remains in the power circuit of the steam power plant.

In this description the term "thin-film evaporation process" refers to a process for evaporating a liquid by distributing the liquid evenly over heating surfaces that are heated by a heating medium through indirect heat exchange. The liquid disposed on the heating surfaces forms a thin film over the heating surfaces and partially evaporates to maintain vapour at pressure. A thin film of liquid occupies a portion of space and fills the remainder of the space with evaporated vapour at a pressure. The process is known as falling-film evaporation when the liquid film flows downwards by gravity over a heated surface. Falling film evaporators are also sometimes referred to as spray-film evaporators. In practical implementation a recycle pump could provide a recirculation of the liquid undergoing partial evaporation. Advantages of this process lies in the high overall heat transfer coefficient and low power to induce circulation compared to other evaporation technologies and offers cost and installation space savings. The heat exchange surface elements can be tubular or lamellar.

In this description the term "steam engine" refers to a machine that performs mechanical work using steam as its working fluid through the agency of heat. It comprises steam turbines, reciprocating steam engines and rotary steam engines.

In this description the term "auxiliary steam condenser" refers to an auxiliary heat exchange device of induced draft direct air-cooled design. The terms induced or forced drafts used interchangeably refer to a mechanically assisted draft as opposed to a natural convective draft.

In this description the term "exhaust steam" will also designate "extraction steam" emitted after partial expansion from an intermediate stage of a multi-stage steam turbine.

In this description the term "direct contact" water heating refers to a process in which water is heated by directly mixing it with the heating steam i.e the heating steam and water comes into direct contact with one another. A "direct contact" feed water heater is a heat exchanger in which heating steam is allowed to mix with the water.

In this description the term "regenerative feed heating" refers to a way of raising the temperature of the make-up water before it reaches the vessel and it does this by using the useful heat from the power circuit through internal heat transfer within the system. A "regenerative heat exchanger" is a closed feed water heater where the fluid streams are maintained separated allowing only heat exchange to take place for regenerative feed heating.

In this description steam pressure at the inlet to the reaction stages of the steam turbine is referred to as "first-stage pressure" although in impulse turbines having an impulse chamber, it is alternatively referred to as impulse chamber pressure. However, to avoid confusion, the term first-stage will be used henceforth to indicate the designated condition of the steam prior to its entry into the reaction stages of the turbine however derived. A first stage pressure versus steam flow curve is a good indicator of inlet steam flow of a steam turbine. This curve is usually supplied by the turbine manufacturer and is normally accurate to within 2.0% when the machine is in new condition. The turbine end gland leakage flow values will also be supplied by manufacturer to make adjustments to the exhaust steam flow.

The pressure value is described in units of kilo pascals (kPa) in the present description and refers to absolute pressure, where the atmospheric pressure is approximately 101.325 kPa.

Elements which are not necessary to understand the invention, such as, for example, the high pressure feed water heaters on the power circuit, external thermal energy storage facility, demineralised water storage tank, surge tank on process condensate return system, thermal insulation and make-up water pre-treatment are not shown. The direction of flow of the working medium is marked by arrows.

Figure 2:
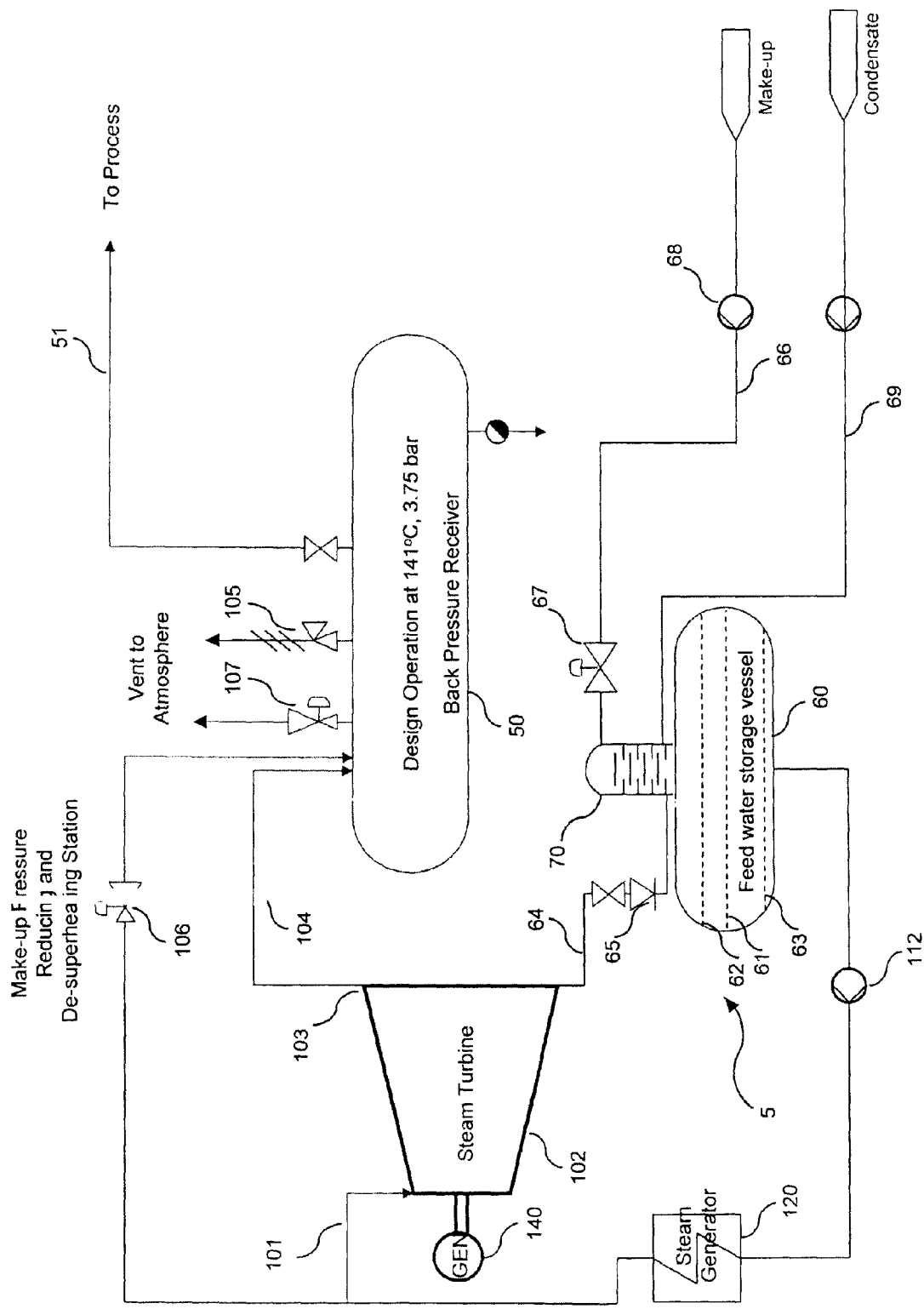
FIG. 2 shows an arrangement of a combined heat and power system used in a palm oil mill extraction plant in a first embodiment of the present invention.

An embodiment of the present invention is depicted in FIG. 2 as a schematic diagram where the figure shows part of a combined heat and power system that involves the present invention as used in a palm oil extraction plant. The means or apparatus of the embodiment is generally denoted by reference numeral (5). This embodiment provides internal thermal energy buffer capacity for a downstream process steam by accumulating and releasing a confined reserve quantity of heated water during a period of sustained cyclic thermal energy imbalance operating at substantially constant pressure and temperature. A steam turbine (102) receives a flow of steam from a steam source through conduit (101) and expands it to generate mechanical power, which is converted by electric generator (140) into electrical power. The expanded steam is exhausted via exit port (103) and is conveyed through conduit (104) to a back pressure receiver (50) from which it is distributed via conduit (51) as process steam at about 375 kPa and 141° C. to a palm oil extraction plant. A portion of the exhaust steam is drawn as heating steam into a feed water heater (70) via conduit (64) to preheat incoming make-up water supplied via conduit (66) to generate heated feed water for supply to the steam generator (120). The make-up water supply is substantially fresh treated water at ambient temperature because only a little condensate from the palm oil extraction process returns via conduit (69). The feed water heater (70) is in fluid communication with a feed water storage vessel (60) and the heated feed water is transitionally stored in the storage vessel (60) from where it is supplied for steam generation by pump (112). During periods of surplus process steam, a larger quantity of heating steam is drawn into the feed water heater (70) via conduit (64) to generate additional hot feed water by preheating a larger quantity of incoming make-up water supplied via conduit (66). The additional feed water is confined in the storage vessel (60) at substantially constant pressure and temperature as internal thermal energy buffer capacity. During periods of deficit process steam, the hot water generation is slowed or stopped by throttling the incoming make-up water by a flow control device (67) thereby curtailing the heating steam that is drawn into the feed water heater used in preheating the make-up water and such untapped heating steam being allowed instead to make up for the deficit process steam, and the steam generation receiving at all times a constant supply of the preheated feed water stored transitionally in the storage vessel (60). The heating steam drawn into the feed water heater is regulated to even out the process steam imbalances and maintain a stable process steam pressure by way of regulating the incoming make-up water flow rate by a flow controllable means on the make-up water circuit (66). The flow controllable means of regulating the make-up water flow rate includes a variable frequency drive for the make-up pump (68) on the make-up water circuit (66). Beneficially, the pressure loss in the steam conduit (64) is kept low in order to maintain a feed water heater operating pressure close to the heating steam pressure, heating steam pressure being substantially at steam turbine exhaust steam pressure, to ensure a high feed water temperature. The reserve quantity of hot feed water in the storage vessel (60) varying between high level (62) and low level (63) provides the useful thermal energy buffer capacity. The reserve quantity of water remaining at low level (63) provides the necessary surge capacity for safe plant operation. The heated feed water transitionally stored in the storage vessel (60) is withdrawn out of the storage vessel for any use where its thermal energy is beneficially utilized. Such alternative or additional beneficial use of the stored thermal buffer energy provides reserve thermal capacity in terms of buffer flow rate during thermal imbalance. Conveniently, the required space for the reserve quantity of hot feed water in the storage vessel (60) can be reduced and supplanted with an external thermal storage system, the internal thermal buffer capacity providing the rapid response for transient imbalances and reaction time for the activation of the external thermal energy storage system. However, an external thermal storage system operating at a lower temperature may provide lower thermal buffer capabilities. Conveniently, feed water heating can be carried out by injecting heating steam through steam spargers directly into the water in the storage vessel (60) where the thermal energy from the heating steam is transferred to the water and the heating steam is condensed. However, such a method may not be efficient to impart the rapid heating required to provide the necessary response time to deal with transient load changes.

The aforementioned feature of the thermal energy buffer capacity is advantageously used for levelling the process steam load in a sustained cyclic thermal energy imbalance, the incoming make-up water being at a lower temperature than the saturation temperature of the heating steam, heating steam being substantially at steam turbine exhaust steam pressure, used for preheating the make-up water. The feed water heater (70) preheats incoming make-up fluid advantageously to or near saturation temperature of the heating steam. A direct contact heat exchanger (70) imparts rapid heating of make-up water to provide the necessary response time for fast transient load changes with an economic plant. The reserve capacity in terms of steam flow rate available is a function of the enthalpy difference between the incoming make-up water and the feed water in the heated state. Therefore a higher temperature of heated water temperature provides a correspondingly higher reserve capacity in terms of steam flow rate, saturation temperature of the heating steam being the highest practical temperature attainable. Advantageously, hot water is generated and beneficially used at the saturation temperature of the heating steam, which is 141° C. as shown in the diagram. Conveniently, heating steam can be drawn at a pressure higher than the process steam pressure from a multi stage steam turbine to provide the thermal buffer capacity. However, in such an instance steam flows within the steam turbine will deviate from the steady state flow rates during the operation of the thermal buffer capacity. Hot water generation and storage above boiling point temperature of ambient atmospheric pressure requires the feed water heater (70) and the storage vessel (60) to operate at or higher than ambient atmospheric pressure.

FIG. 1 shows an example of downstream process steam load profile in a typical palm oil extraction plant that exhibits a sustained cyclic load. Sustained cyclic demand is observed between the periods (a)-(b), (b)-(c), (c)-(d), and (d)-(e), with an average sustained cycle time of about 14 minutes. By way of example we use FIG. 1 to elaborate working of an exemplary embodiment as shown in FIG. 2. The average process steam flow over a cycle of successive process steam load is 5.9 kg/s (B), dip process steam flow 2.2 kg/s (A), regular peak process steam flow 7.7 kg/s (C) and sporadic peak process steam flow 9.3 kg/s (D). The make-up water temperature is at 30° C., and the exhaust steam discharged is dry saturated at 141° C. Considering the average process steam demand of 5.9 kg/s (B) and taking a steam generator blowdown rate of 0.6 kg/s, heat and mass balance shows the average make-up water flow as 6.5 kg/s and the exhaust steam drawn as heating steam for heating the make-up water to the saturation temperature of 141° C. as about 1.4 kg/s, assuming that the heated make-up water is supplied exclusively as feed water for the steam generation and the blowdown in the steam generator (120). The heating steam flow rate, 1.4 kg/s can be curtailed to meet process steam load during periods of process steam deficit, by throttling the make-up water flow and the steam generation continuing to receive feed water from the reserve capacity of hot water confined in the storage vessel (60) at substantially constant pressure and temperature. In this example, the maximum reserve capacity available in terms of steam flow rate is 1.4 kg/s, which is about 24% of an average process steam load (E).

A steady state operation of the CHP is set to output a constant supply of process steam that meets a highest possible average process steam demand (E) that is below a peak process steam demand (F) that is limited to not more than 24% above the highest possible average process steam demand (E), while heating a designated flow rate of make-up water, in the profile depicted in FIG. 1. Under these conditions of CHP operation the varying thermal imbalance below the identified peak process steam demand (F) is expected to be met over the period of sustained cyclic steam demand aided by the reserve thermal buffer capacity. Therefore, in this example, a steam turbine set to operate at a steady state discharging its exhaust steam at 7.2 kg/s to supply the downstream process at a rate of 5.8 kg/s (E) will be able to meet the varying process steam demands below an upper limit of the 7.2 kg/s over the sustained cyclic duration aided by the reserve thermal buffer capacity. The steady state exhaust steam rate of 7.2 kg/s provides the highest possible average process steam demand of 5.8 kg/s (E) and the heating steam of 1.4 kg/s required to heat the designated flow rate of make-up water at 6.5 kg/s. The highest possible average process steam demand of 5.8 kg/s (E) is the average value of the process steam demand below an upper limit steam flow rate of 7.2 kg/s (F) in the profile depicted in FIG. 1, the upper limit steam flow rate of 7.2 kg/s (F) being the rate that can be met when the maximum reserve capacity of the thermal buffer is operational. During the steady state operation feed water for the steam generator (120) is supplied at a rate of 5.8 kg/s and an additional feed water for the steam generator blowdown rate of 0.6 kg/s leaving an excess heated make-up water of 0.1 kg/s to accumulate in the storage vessel (60), which begins to get consumed during periods when the process steam demand increases to a flow rate marginally above steady state steam supply 5.8 kg/s (E) and depleted at the end of the cyclic load duration.

The CHP will need to adopt a means to meet peak process steam demand in excess of the 7.2 kg/s (F) being the rate that can be met when the maximum reserve capacity of the thermal buffer is operational, for example, during the regular peak transient deficit of 0.5 kg/s (C-F) and the sporadic peak transient deficit of 2.1 kg/s (D-F). The steam turbine output, where possible, can be raised above the steady state output to discharge additional exhaust steam or a live steam pressure reducing and desuperheating station (106) can be operated to discharge additional steam for process steam during these times. However, more importantly with the thermal buffer capacity the CHP is able to avoid a sudden change from the minimum process steam demand (A) to the maximum process steam demand (F), which is almost a step change, only to cope with a smaller transient deficit of (C-F).

During periods of highest surplus process steam there is an excess steam of 3.6 kg/s (E-A) over the mean value (E) that needs to be harnessed. This requires a heating of about an additional 16.5 kg/s of make-up water and combined with the heating steam condensate of 3.6 kg/s generates about 20.1 kg/s of hot water at saturation temperature, which hot feed water is confined as reserve thermal capacity with the steady state accumulation at a rate of 20.2 kg/s after allowing for the steady state consumption for steam generation. Thus, the feed water heater will have a maximum capacity to cope with 3.5 times the steady state heating capacity. In the worst case of a single step change from minimum (A) to maximum (C) process steam flows within the sustained cyclic duration, the reserve capacity of hot water acquired during surplus period is about 4,800 kg, however, there is more than one peak and dip within the cycle time that allows a smaller reserve space.

This example did not consider the heated feed water supplied to any additional beneficial use, which can provide further reserve thermal capacity to improve upon the maximum flow rate (F). This example has made an assumption that the steam turbine can be set to operate at a steady state discharging its exhaust steam at 7.2 kg/s. In cases where steam turbine mechanical load is limited by its connected load and therefore unable to be set to discharge the required steady state exhaust steam, an amount of live steam make-up will be required to supplement for the shortfall. Sporadic peak transient process demands like (D) are best avoided by better management of the process steam usage or by way of steam flow restriction.

In a palm oil extraction plant the steam demand profile is particularly onerous on the CHP system, especially on the steam generator because the peak demand is almost a step change following a dip demand, which means in this example a step surge of 5.5 kg/s (C-A) or 93% of average steam load (B) on the steam generator. The present invention is able to reduce this surge to 0.5 kg/s (C-F), which is about 8% of average steam load (B) on the steam generator in the event of regular peak process steam demand. The invention is particularly advantageous in such an onerous process steam demand profile because of its almost immediate response limited only by the rate at which the make-up water flow can be regulated, and it does not involve any flashing of hot water because of its constant pressure operation. The surge in process load in this case is substantially prevented from being transmitted to the upstream steam turbine and steam generator.

The inventive arrangement is particularly suited for a CHP plant using a steam engine where the process steam thermal energy imbalance is of a sustained cyclic profile of short duration with steeply rising peaks and steeply descending dips, and the process steam peak deficit not exceeding about 24% above the average process steam supplied in a typical operating temperature parameters as shown in the example. However, the peak surplus process steam during imbalance can be high. The thermal buffer capacity operates substantially at constant pressure and temperature serving to provide rapid response to thermal imbalance without the impediment of steam flashing.

With the aid of the above described invention, steam at sufficiently constant pressure is available for the downstream process at all times, this being a requirement in view of providing stable processing temperatures. In other words, only the sporadic peak loads of the downstream process need be equalized by external means with the present invention herein.

Conveniently, steam flows conveyed to a downstream process can be determined without providing a flow meter on the steam supply conduit. The wide variations in steam flows conveyed to the downstream process make it difficult to correctly measure and record the instantaneous steam flow rate with an ordinary flow meter. However, there is often a need to determine the steam flows, with its variations from maximum to minimum values, to provide monitoring, recording and automation control services. In the configuration of FIG. 2, the flow rate of steam conveyed to the downstream process is determined from a measurement of the flow rate of the exhaust steam discharged from the steam turbine and a measurement of the flow rate of make-up fluid into the feed water heater (70) for storage in vessel (60) when the heated feed water in the storage vessel (60) is maintained at substantially constant pressure and temperature.

The mass flow rate of steam which flows to the downstream process through the supply conduit R1, is calculated from R2, the mass flow rate of exhaust steam discharged from steam turbine and R3, the mass flow rate of make-up water introduced into the storage vessel (60) when feed water in the storage vessel (60) is operating at substantially constant pressure and temperature, according to the following heat balance equation.

$$R1 = R2 - a \cdot R3$$

where $a = (hf_1 - hf_2)/(hg_0 - hf_1)$;
and,
$hg_0$ = enthalpy of steam from steam engine to downstream process;
$hf_1$ = enthalpy of heated water in storage vessel (60);
$hf_2$ = enthalpy of make-up water;

The enthalpy $hg_0$ is evaluated from the steam conditions (pressure, assuming saturated) of the exhaust steam, while $hf_1$ is evaluated from the pressure or temperature in the storage vessel (60), and $hf_2$ is evaluated from the make-up water temperature. The enthalpy values are in units of kJ/kg and mass flow rates are in units of kg/s. The formula applies where the steam to downstream process and the steam for make-up water heating are from the same source.

The mass flow rate R2, is determined from a signal of steam flow from a convenient means like a flow meter for detecting steam flow rate to the steam turbine inlet or a power meter detecting electrical load on the steam turbine generator or the steam turbine first stage pressure. The mass flow rate R3, is determined from a signal of make-up water flow from a flow meter on the make-up water conduit (66). Liquid flow meters for measurement with a large turndown ratio are readily available. A programmed microprocessor receives inputs of the two signals that denote R2 and R3 and output a signal that denotes R3, which is conveniently displayed in a visual screen. The steam flow to the downstream process is determined accurately even when the flow rate is very small or very large, without requiring provision of a flow meter in the steam supply conduit.

Advantageously, an automatic controller can be configured to continually set the steam turbine steady state load on runtime to output exhaust steam to the process, such that a thermal balance is maintained between the surplus and deficit over a determined cyclic time on a running average taking into consideration the thermal buffer capacity of the disclosed invention for the plant. A CHP plant that has the flexibility to adjust its power output, for example running in parallel with the grid can take advantage of such an automation control continually sensing the process steam demand profile on runtime, and setting the steam turbine steady state load as shown in the present example. Within operating limits, the reserve quantity of hot feed water in the storage vessel (60) increase and decreases in response to the steam turbine exhaust to the downstream process increasing or decreasing respectively when the thermal buffer capacity is in operation maintaining constant exhaust pressure for a particular downstream process load. This feature is advantageously used regulate the steam turbine load to maintain the thermal buffer capacity available through the sustained cyclic load with adequate reserve quantity of secondary fluid in liquid phase.

The objects of the disclosure can be harnessed in embodiments where without an intermediate steam turbine, a steam generator (120) supplies a downstream process steam that exhibits sustained cyclic demand and a portion of the process steam is drawn for feed heating to provide internal thermal buffer capacity.

The design of the feed water heater (70) provides for preheating the incoming make-up water to or near saturation temperature of the heating steam drawn to cater for varying flow conditions and remain independent of incoming make-up water temperatures. The operating pressure of the feed water heater is advantageously maintained at all times at the heating steam pressure, which being substantially at the steam turbine exhaust steam pressure. The make-up water flow rate during operation of the internal thermal buffer capacity accumulation or a future external thermal energy storage system is several times higher than the steady state operation of the feed water heater. Make-up water temperatures can range from cold make-up to hot make-up from an external thermal energy storage if included. A two-stage tray type feed water heater design would be one of the options that cater for these variations. Direct contact make-up water preheating imparts rapid heating to provide the necessary response time for transient load changes with an economical configuration. The feed water heater (70), heating steam supply circuit (64) and the make-up water circuit (66) including control equipment will have a capacity to meet requirements of thermal buffer capacity operation. Advantageously, the feed water heater (70) is coupled to the storage vessel (60). In practical implementation a feed water heating system is configured to preheat make-up water introduced for heating and confined in the storage vessel (60) at a maximum flow rate not less than 1.3 times the make-up water flow catering for the maximum continuous rated supply of hot water for the beneficial use under normal operating conditions.

The feed water heater (70) may advantageously incorporate features for simultaneous deaeration to remove non-condensable gases from the incoming make-up water thereby serving both the functions of preheating and removing air and non-condensable gases. The flow non-return device (65) on the conduit (64) prevents rapid depressurisation of the feed water heater (70) and storage vessel (60) that could cause flashing and swell in the storage vessel (60) in the event of pressure loss in the back pressure receiver (50) due to a cause like steam turbine trip.

The feed water heater and storage vessel can be advantageously coupled with an external thermal energy storage system to extend the thermal energy storage capacity. During periods of surplus process steam hot water from the storage vessel (60) is withdrawn to an external thermal energy storage facility; and the same quantity of water, which is withdrawn in this way is replaced with make-up water introduced into the feed water heater (70), thus reducing the surplus process steam, and during periods of deficit process steam, hot make-up water is introduced into the feed water heater (70) from the external thermal energy storage facility, thus reducing the deficit process steam.

It is advantageously the case that a control system communicatively coupled to a flow controllable means located on the make-up circuit (66) regulates the flow of make-up water into the storage vessel (60) to operate its internal thermal buffer capacity in response to thermal energy imbalance. A pressure deviation from a predetermined set-point pressure value in the exhaust steam directed to the downstream process is a convenient measure of the thermal imbalance. A pressure deviation signal from a sensor sensing the steam pressure can be used as an input to the control system operable to selectively increase or decrease the flow rate of make-up water for heating into the storage vessel (60) in response to a positive or negative pressure deviation from a predetermined set-point pressure value respectively of the exhaust steam, in order to regulate the pressure of the exhaust steam to maintain the steam pressure substantially at the set-point value. A "positive pressure deviation" denotes pressure greater than the predetermined set-point value.

The control system further comprising sensor for sensing the level of liquid surface in the storage vessel (60) includes a master level control operable to impress a signal upon the steam turbine (102) governor or the make-up steam pressure reducing and desuperheating station (106) to selectively decrease or increase the output of exhaust steam to the downstream process in response to a rising or falling liquid surface level in the storage vessel (60) from a predetermined level value (61) respectively. The master level control can be tuned loosely allowing the level to rise and fall in response to any short term imbalances. A non-linear control algorithm can be used to loose control the level in the storage vessel, where the control responds to small errors with a small gain; it responds to large errors with a large gain. This means that in the vicinity of the set-point, the control allows the level to drift freely. The predetermined level set-point (61) is based on the operator's estimate of the nature of the downstream process load variations and whether the most probable thermal imbalance will require additional accumulation or depletion capacity of the confined reserve quantity of hot water.

Figure 3:
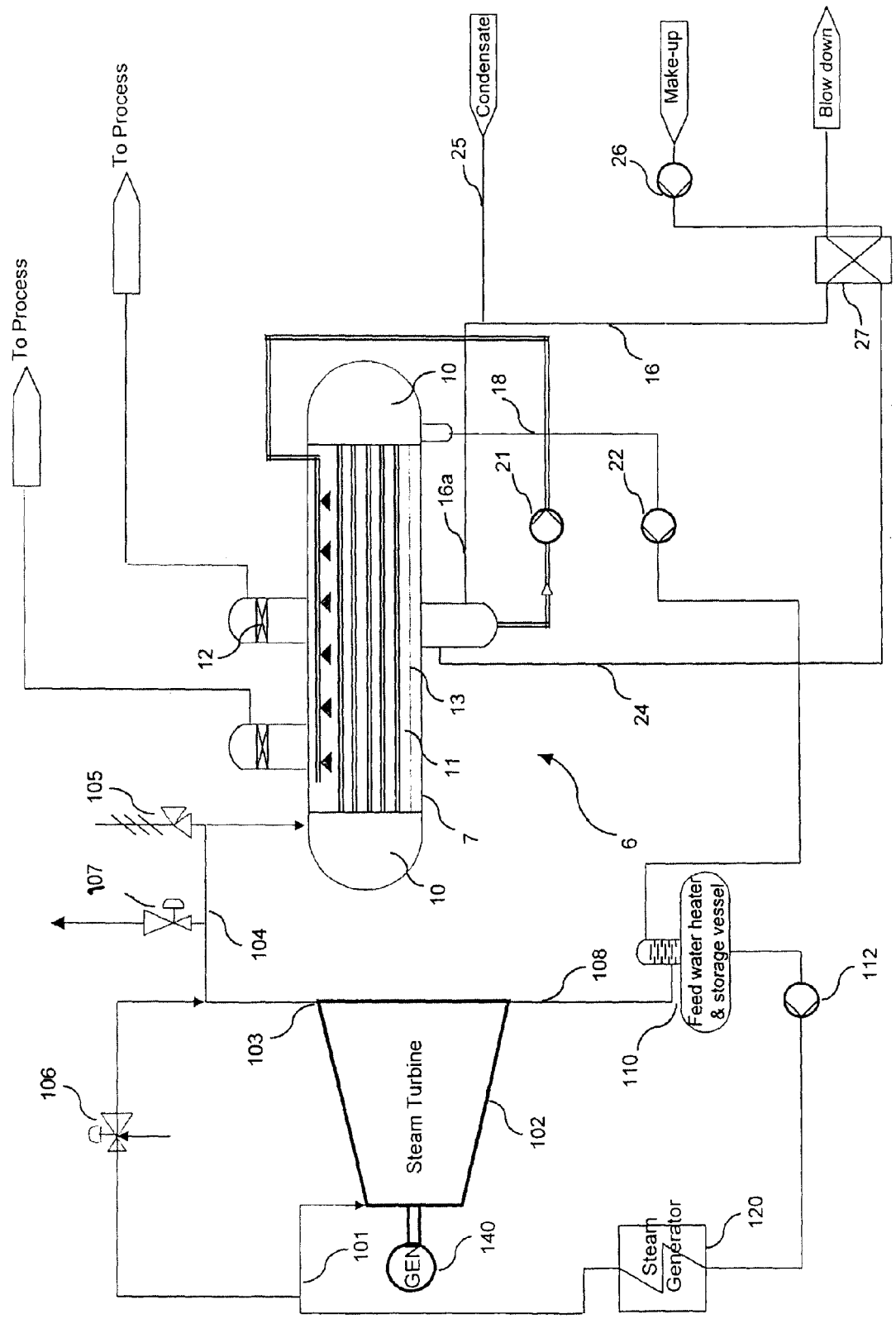
FIG. 3 shows an arrangement of a combined heat and power system used in a palm oil mill extraction plant in a second embodiment of the present invention.

An embodiment of the present invention is depicted in FIG. 3 as a schematic diagram where the figure shows part of a combined heat and power plant. The means or apparatus of the embodiment is generally denoted by reference numeral (6). This embodiment provides fluid separation between the power generation process and the technological process. A steam turbine (102) receives a flow of steam from a steam generator (120) through conduit (101) and expands it to generate mechanical power, which is converted by electric generator (140) into electrical power. The expanded steam is exhausted via an exit port (103) and is conveyed through conduit (104) to a vessel plant (6), which operates as an intermediate device between the power circuit and the external process heat circuit. The exhaust steam after dissipating its thermal energy and precipitating as primary condensate in a primary space (10) of the vessel plant (6) is withdrawn from the primary space and returned to the steam generator (120) via conduit (18) and condensate pump (22) retained in the power circuit. A make up water introduced into a secondary space (11) of the vessel plant (6) evaporates by means of the dissipated thermal energy conducted across to the secondary space and the generated steam is supplied to an external process, the secondary space forming part of the external process heat circuit. Any condensate from the external process heat circuit is returned to the secondary space (11) of the vessel plant (6) via conduit (25). The make-up fluid circuit supplies make-up water via make-up water pump (26) through conduit (16). The primary condensate withdrawn from the primary space (10) can be utilized for any use where its thermal energy is beneficially harnessed although commonly its thermal energy is retained in the power circuit. The embodiment as shown operates with the whole of the steam turbine exhaust steam directed to the vessel plant (6).

In prior art configurations, the steam turbine exhaust pressure is established at design time by external process temperature. With an intermediate vessel plant (6) however, the secondary steam pressure instead is established by the external process temperature. The vessel plant (6) being an indirect heat transfer device requires a temperature differential across the primary and the secondary spaces to induce heat flow. A greater temperature differential helps in indirect heat exchange but the accrued higher primary side steam turbine exhaust temperatures and pressures translate into higher lost power potential of the steam turbine. Therefore, a smaller temperature differential is preferred in order to minimise the lost power potential of the steam turbine. In addition, a smaller design operating temperature differential is advantageous in keeping the ensuing widening of temperature differential small in the event of an increased thermal energy discharge to the vessel. An object of the present invention is therefore to keep the design operating temperature differential across the indirect heat transfer device small, but this will invariably increase heat exchange surface areas and costs. Thus an economic balance between the two is established at design time to fix the optimum temperature differential.

As an example, the vessel is configured to operate at a secondary steam pressure of 170 kPa and the steam turbine exhaust pressure (primary steam pressure) set at 220 kPa, thus providing a temperature differential across the indirect heat transfer device of about 8° C. In this configuration the heat exchange surface area required is considered economical with a lost power potential of about eight percent (8%) due to the higher exhaust pressure, considering that the plant operational reliability, flexibility and improvement in overall efficiency of the CHP system is enhanced. The heat exchange surface area contributes to a major proportion of the cost of the inventive plant arrangement.

It is understood that CHP applications using back pressure steam turbines operate with an exhaust pressure greater than ambient atmospheric pressure, but rarely near 680 kPa. It is therefore contemplated that in practical implementation the vessel is operated at a secondary steam pressure greater than ambient atmospheric pressure and not greater than about 680 kPa. However, while the higher pressure of 680 kPa is not a physical limitation, it may not be considered as economic due to high turbine lost power potential.

The heart of this embodiment is the vessel plant (6) which comprises a vessel (7) and subsystems for condensate removal from the primary space and make-up water supply to the secondary space. Exhaust steam from the steam turbine (102) and/or live steam make-up from a pressure reducing and de-superheating station (106) bypassing the steam turbine are withdrawn into a primary space (10) of the vessel as primary steam where it precipitates as condensate by dissipating its thermal energy to a secondary space (11) of the vessel (7). The secondary space (11) of the vessel receives make-up water via conduit (16a) and generates a secondary steam using the received dissipated thermal energy for use in an external process, the secondary space forming part of the external process heat circuit. A flow controllable means located on the make-up circuit regulates the make-up flow into the secondary space to maintain a stable liquid surface level at predetermined set-point operating liquid surface level (13) in the secondary space. A flow controllable means of regulating the make-up water flow rate includes a variable frequency drive for the make-up pump (26) on the make-up water circuit (16). A controller communicatively coupled to the flow controllable means comprising sensor for sensing the level of liquid surface in the secondary space and a control means operable to regulate the flow of make-up water in response to a level deviation from the predetermined level value (13) can be advantageously applied. The make-up water admitted into the secondary space is preheated by direct contact with the existing hot fluid in the secondary space.

The embodiment shows a vessel (7) utilising thin-film evaporation process with assisted circulation design that imparts high heat transfer coefficient. In practical implementation, the overall heat transfer coefficient for such a design can be about 3 kW/K-m$^2$, offering cost and installation space savings.

The embodiment showing a vessel plant (6) includes a vessel (7), a recycle pump (21), a condensate pump (22), instrumentation and control, and associated piping. The vessel plant (6) can conveniently consist of more than one vessel (7) and supporting equipment. The vessel (7) contains a plurality of horizontal tubes. The primary steam flowing from the steam turbine flows through the tubes dissipating its heat to the tube wall and precipitates as condensate inside the tubes at its saturation temperature, the inside of the tubes forming part of the primary space (10). The dissipated heat is conducted across the tube walls and absorbed by evaporation boiling in thin water films flowing over the outside of the tubes in the secondary space (11). A recycle pump (21) provides the necessary assisted circulation with a spray or tray means of distributing the circulated water uniformly over the tube bundle overhead to establish thin-film evaporation process where partial evaporation takes place as the circulated water cascades down the tube bundle in the secondary space. The operating liquid surface level in the secondary space of the vessel (7) is maintained below the horizontal heat exchanger tubes. The condensate of the primary steam inside the tubes drains to a collection pot from which it is withdrawn by the condensate pump (22). The evaporated steam in the secondary space (11) is supplied to an external process.

Advantageously, an internal thermal buffer capability is incorporated into the vessel plant (6, 7) as described herein. A predetermined reservoir space to hold a reserve quantity of the secondary fluid in liquid phase is provided in the secondary space (11). The hot water reserve quantity is allowed to vary with the liquid surface level fluctuating about a predetermined set-point operating liquid surface level (13) in the secondary space of the vessel (7) providing an internal thermal buffer/inertia capability to make up for process steam thermal imbalance using a suitable control system. Any deficit in process thermal energy that makes a demand on the vessel (7) is met rapidly by temporarily throttling the incoming make-up water into the vessel by a flow controllable means on make-up conduit (16) and the confined reserve hot water continuing to evaporate at substantially constant pressure and temperature to produce steam; temporarily throttling to slow or stop the incoming make-up water curtails the drawing of thermal energy in the secondary space for preheating the incoming make-up water to the saturation temperature in the secondary space and such untapped thermal energy being allowed instead to meet the increased process load. Direct contact make-up water preheating provides the necessary response time to cope with fast transient load changes. This feature of the invention allows the steam turbine to be operated at steady load conditions while the thermal load can fluctuate, depending on the thermal design parameters of the system, providing temporarily up to about 25% above the average heat supply, which should suffice to meet the needs of a normal CHP plant.

The working of the internal thermal buffer feature is brought about by the temperature difference between incoming make-up water and the saturated temperature of the hot water reserve in the secondary space. Surge steam demand is provided by the resultant saving in heat required to raise the temperature of the incoming make-up water to the saturation temperature of the secondary space (11) thus producing more steam for the external process. The confined reserve hot water continues to evaporate when the incoming make-up water flow is restricted. The confined reserve water is principally accumulated during periods of low thermal consumption and said reserve water continuing to be evaporated off principally during periods of high thermal consumption. This feature is advantageously used in leveling the process steam load in a sustained cyclic thermal energy imbalance.

The water quantity in the secondary space of the vessel (7) varying between a high water level and a low water level, the water surface level fluctuating about a predetermined set-point operating liquid surface level (13) forms the reserve quantity of hot water that provides the internal thermal buffer capacity. The low water level provides minimum suction head required for safe operation of recycle pump (21). The reserve water quantity in the secondary space is predetermined to meet the thermal buffer capacity of user requirement depending on the profile of sustained cyclic thermal imbalance. In practical implementation the quantity of reserve water is predetermined to provide a buffer capacity to cater for the duration of a sustained cyclic thermal imbalance. Conveniently, the required space for the internal thermal buffer reserve capacity can be reduced and supplanted with an external thermal storage system, the internal buffer capacity providing the rapid response for transient imbalance and reaction time for the activation of the external thermal energy storage system. However, an external thermal storage system operating at a lower temperature may provide lower thermal buffer capabilities.

FIG. 1 shows an example of downstream process steam load profile that exhibits a sustained cyclic load. Sustained cyclic demand is observed between the periods (a)-(b), (b)-(c), (c)-(d), and (d)-(e), with an average sustained cycle time of about 14 minutes. By way of example we use FIG. 1 to elaborate the working of an exemplary embodiment as shown in FIG. 3 where a steam turbine discharges its exhaust steam into the primary space (10) and steam from the secondary space (11) supplies the downstream process steam. An internal thermal buffer capacity is provided by varying the flow rate of incoming make-up water into the secondary space. The average process steam flow over a cycle of successive process steam load is 5.9 kg/s (B), dip process steam flow 2.2 kg/s (A), regular peak process steam flow 7.7 kg/s (C) and sporadic peak process steam flow 9.3 kg/s (D). The make-up water temperature is at 30° C., and the secondary steam is dry saturated at 115° C. Considering the average process steam demand of 5.9 kg/s (B) and taking a blowdown rate from the secondary space of 0.3 kg/s, heat and mass balance shows the average make-up water flow as 6.2 kg/s and the secondary steam drawn for heating the make-up water to the saturation temperature of 115° C. as about 1.0 kg/s. The heating steam flow rate, 1.0 kg/s can be curtailed to meet process steam load during periods of process steam deficit, by throttling the make-up water flow and the secondary steam generation continuing to evaporate feed water from the reserve capacity of heated water confined in the secondary space at substantially constant pressure and temperature. In this example, the maximum reserve capacity available in terms of steam flow rate is 1.0 kg/s, which is about 18% of an average process steam supply (E).

A steady state operation of the CHP is set to input a constant supply of primary steam into the primary space (10) of the vessel (7) such that the secondary steam output meets a highest possible average process steam demand (E) that is below a peak process steam demand (F) that is limited to not more than 18% above the highest possible average process steam demand (E), while heating a designated flow rate of make-up water, in the profile depicted in FIG. 1. Under these conditions of CHP operation the varying thermal imbalance below the identified peak process steam demand (F) is expected to be met over the period of sustained cyclic steam demand aided by the reserve thermal buffer capacity. Therefore, in this example, a steam turbine set to operate at a steady state discharging its exhaust heat to the vessel (7) to evaporate secondary steam at about 6.6 kg/s and discharge its output to the downstream process at a rate of 5.6 kg/s (E) will be able to meet the varying process steam demands below an upper limit of the 6.6 kg/s over the sustained cyclic duration aided by the reserve thermal buffer capacity. The steady state secondary steam evaporation rate of 6.6 kg/s provides the highest possible average process steam demand of 5.6 kg/s (E) and the heating steam of 1.0 kg/s required to heat the designated flow rate of make-up water at 6.2 kg/s. The highest possible average process steam demand of 5.6 kg/s (E) is the average value of the process steam demand below an upper limit steam flow rate of 6.6 kg/s (F) in the profile depicted in FIG. 1, the upper limit steam flow rate of 6.6 kg/s (F) being the rate that can be met when the maximum reserve thermal buffer capacity is operational.

During the steady state operation feed water for the secondary steam generation is consumed at a rate of 5.6 kg/s and an additional feed water is blowdown from the secondary space at a rate of 0.3 kg/s leaving an excess heated make-up water of 0.3 kg/s to accumulate in the secondary space (11), which begins to get consumed during periods when process steam demand increases to a flow rate marginally above steady state steam supply 5.6 kg/s (E) and depleted at the end of the cyclic load duration.

The CHP will need to adopt a means to meet peak process steam demand in excess of the 6.6 kg/s (F) being the rate that can be met when the maximum reserve thermal buffer capacity is operational, for example, during the regular peak transient deficit of 1.1 kg/s (C-F) and the sporadic peak transient deficit of 2.7 kg/s (D-F). The steam turbine output, where possible, can be raised above the steady state output to discharge additional exhaust heat or a live steam pressure reducing and desuperheating station (106) can be operated to discharge additional heat for secondary steam generation during these times. The vessel (7) will have the evaporative capacity to meet a peak steam demand, which in case of the regular peak steam demand (C) is an evaporative capacity of 7.7 kg/s from and at 115° C. However, more importantly with the thermal buffer capacity the CHP is able to avoid a sudden change from the minimum process steam demand (A) to the maximum process steam demand (F), which is almost a step change, only to cope with a smaller transient deficit of (C-F).

During periods of highest surplus process steam there is an excess steam of 3.4 kg/s (E-A) over the mean value (E) that needs to be harnessed. This requires heating of about an additional 21.2 kg/s of make-up water and combined with the heating steam condensate of 3.4 kg/s generates about 24.6 kg/s of hot water at saturation temperature, which hot feed water is confined as reserve thermal capacity with the steady state accumulation at a rate of 24.9 kg/s after allowing for the steady state evaporation for steam generation. Thus, the feed water heater will have a maximum capacity to cope with 4.4 times the steady state heating capacity. In the worst case of a single step change from minimum (A) to maximum (C) process steam flows within a the sustained cyclic duration, the reserve capacity of hot fluid acquired during surplus period is about 4,700 kg, however, there is more than one peak and dip within the cycle time that allows a smaller reserve space.

This example has made an assumption that the steam turbine can be set to operate at a steady state discharging its exhaust heat to generate secondary steam at about 6.6 kg/s. In cases where the steam turbine mechanical load is limited by its connected load and therefore unable to be set to discharge the required steady state exhaust heat, an amount of live steam make-up will be required to supplement for the shortfall. Sporadic peak transient process demands like (D) are best avoided by better management of the process steam usage or by way of steam flow restriction.

In a palm oil extraction plant the steam demand profile is particularly onerous on the CHP system, especially on the steam generator because the peak demand is almost a step change following a dip demand, which means in this example a step surge of 5.5 kg/s (C-A) or 93% of average steam load (B) on the steam generator. The present invention is able to reduce this surge to 1.1 kg/s (C-F), which is about 18% of average steam load (B) on the steam generator in the event of regular peak process steam demand. The invention is particularly advantageous in such an onerous process steam demand profile because of its almost immediate response limited only by the rate at which the make-up water flow can be regulated, and it does not involve any flashing of hot water because of its constant pressure operation. The surge in process load in this case is substantially prevented from being transmitted to the upstream steam turbine and steam generator.

The inventive arrangement is particularly suited for a CHP plant using a steam engine where the process steam thermal energy imbalance is of a sustained cyclic profile of short duration with steeply rising peak and steeply descending dip, and the process steam peak deficit not exceeding about 18% above the average process steam supplied in a typical operating temperature parameters as shown in the example. However, the peak surplus steam during imbalance can be high. The thermal buffer capacity operating substantially at constant pressure and temperature provides rapid response to thermal imbalance without the impediment of steam flashing.

With the aid of the vessel plant (6) of the present invention, steam at sufficiently constant pressure is available for the downstream process at all times, this being a requirement in view of providing stable processing temperatures. In other words, only the sporadic peak loads of the downstream process need be equalized by external means with the present invention herein.

Conveniently, vaporized secondary fluid flows discharged from the secondary space (11) and conveyed to the downstream process is determined without providing a flow meter on the vaporized secondary fluid discharge outlet conduit. The wide variations in fluid flows discharged from the secondary space make it difficult to correctly measure and record the instantaneous fluid flow rate with an ordinary flow meter. However, there is often a need to determine the discharged secondary fluid flows, with its variations from maximum to minimum values, to provide monitoring, recording and automation control services. In the configuration of FIG. 3, the flow rate of vaporized secondary fluid discharged from the secondary space (11) is determined from a measurement of the flow rate of the primary steam flow into the primary space (10) and a measurement of the flow rate of flow of make-up fluid into the secondary space (11) when the vessel (7) is operating at substantially constant pressure and temperature.

The mass flow rate of vaporized secondary fluid which flows through the discharge conduit R1, is calculated from R2, the mass flow rate of exhaust steam discharged from steam turbine into the primary space (10) as primary steam and R3, the mass flow rate of make-up fluid introduced into the secondary space (11) when the vessel (7) is operating at substantially constant pressure and temperature, according to the following heat balance equation.

$$R1*(hg_1-hf_1)=R2*(hg_0-hf_0)-R3*(hf_1-hf_2)$$

where,
$hg_0$=enthalpy of primary steam;
$hf_0$=enthalpy of primary condensate;
$hg_1$=enthalpy of secondary fluid in vapour state;
$hf_1$=enthalpy of secondary fluid in liquid state;
$hf_2$=enthalpy of make-up water;

The enthalpy $hg_0$ and $hf_0$ are evaluated from the steam conditions (pressure, assuming saturated) in the primary space (10), while $hg_1$ and $hf_1$ are evaluated from the fluid conditions (pressure or temperature) in the secondary space (11), and $hf_2$ is evaluated from the make-up fluid temperature. The enthalpy values are in units of kJ/kg and mass flow rates are in units of kg/s.

The mass flow rate R2, is determined from a signal of steam flow from a convenient means like a flow meter for detecting steam flow rate to the steam turbine inlet or a power meter detecting electrical load on the steam turbine generator or a measure of pressure or temperature in the primary space when the secondary space (11) is under constant pressure and temperature operation or the steam turbine first stage pressure. The mass flow rate R3, is determined from a signal of make-up fluid flow from a flow meter on the make-up water conduit (16). Liquid flow meters for measurement with a large turndown ratio are readily available. A programmed microprocessor receives inputs of the two signals that denote R2 and R3 and output a signal that denotes R3, which is conveniently displayed in a visual screen. The vaporized secondary fluid flow is determined accurately even when the flow rate is very small or very large, without requiring provision of a flow meter in the vaporized secondary fluid discharge conduit.

Advantageously, an automatic controller can be configured to continually set the steam turbine steady state load on runtime to output exhaust steam to the process, such that a thermal balance is maintained between the surplus and deficit over a determined cyclic time on a running average taking into consideration the thermal buffer capacity of the disclosed invention for the plant. A CHP plant that has the flexibility to adjust its power output, for example running in parallel with the grid can take advantage of such an automation control continually sensing the process steam demand profile on run time, and setting the steam turbine steady state load as shown in the present example. Within operating limits, the reserve quantity of secondary fluid in liquid phase in the secondary space (11) increase and decreases in response to the primary steam withdrawn into the primary space (10) increasing or decreasing respectively when the thermal buffer capacity is in operation maintaining constant pressure in the secondary space (11) for a particular downstream process load. This feature is advantageously used regulate the steam turbine load to maintain the thermal buffer capacity available through the sustained cyclic load with adequate reserve quantity of secondary fluid in liquid phase.

Figure 4:
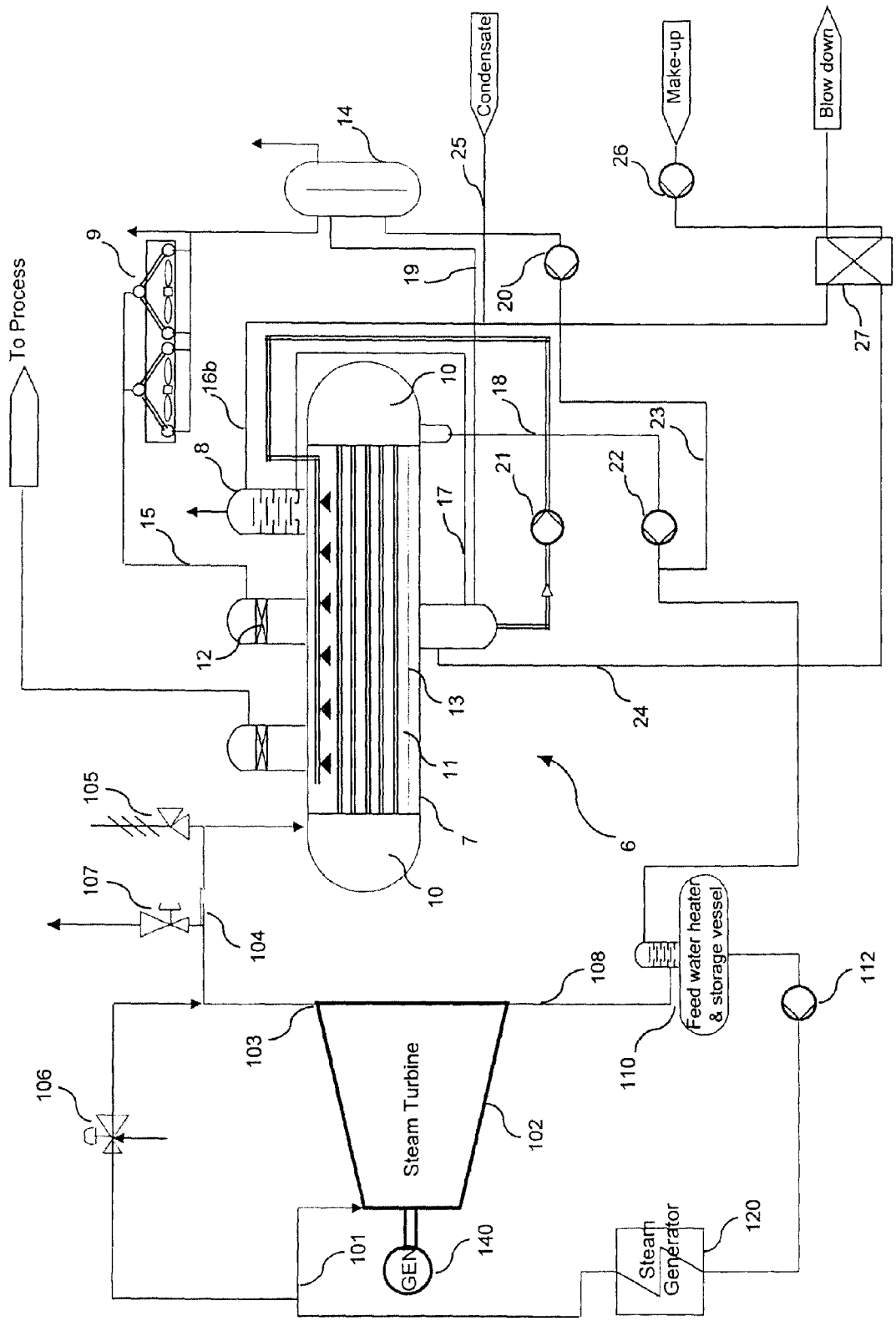
FIG. 4 shows an arrangement of a combined heat and power system used in a palm oil mill extraction plant in a third embodiment of the present invention.

Referring to FIG. 4, advantageously a feedwater heater (8) is coupled with the said vessel (7) to preheat the make-up water by means of the vapour generated in the secondary space (11) prior to its entry into the secondary space (11) of the vessel (7). The make-up water circuit supplies make-up water via make-up water pump (26) via conduit (16b) to the feedwater heater (8). The preheated water is discharged from the feedwater heater (8) via conduit (17). A flow controllable means located on the make-up circuit regulates the make-up flow to maintain level of the liquid surface in the secondary space (11).

The feedwater heater (8) is coupled with the vessel (7) in fluid communication with secondary space to receive vapour for its operation and discharge the preheated make-up water at or below the operating liquid surface level (13) into the secondary space avoiding any adverse interference of the make-up water with the thermal fluid dynamics of the thin-film evaporation process. Advantageously, close coupling the feedwater heater (8) to the vessel (7) provides an advantage in reducing pressure losses in the feed water heater steam supply and water discharge paths, and allows gravity discharge of the heated fluid from the feedwater heater (8) via conduit (17) to the secondary space of the vessel, without a separate transitional storage and transfer pump for delivering the preheated make-up water to the vessel (7).

The design of the feedwater heater (8) provides for preheating the incoming make-up water to or near saturation temperature to cater for varying flow conditions and remain independent of incoming make-up water temperatures. The feedwater heater (8) is configured to cater for efficiently preheating large quantity of water, several times the steady state make-up flow during operation of the internal thermal buffer capacity accumulation or a future external thermal energy storage system, and make-up fluid temperatures can vary from cold make-up to hot make-up from external thermal energy storage. Direct contact heat exchanger provides rapid heating with an economical plant and rapid preheating provides the necessary response time for transient load changes expected of the plant. A two-stage tray type feed water heater design would be one of the options that meet these requirements. The preheating of cold make-up water in the feedwater heater (8) and to near saturation temperature avoids any adverse interference of the make-up water with the thermal fluid dynamics of the thin-film evaporation process and potential thermal stress in the vessel (7) particularly during such large cold water flows. The feedwater heater (8) and the make-up fluid circuit (16) including control equipment will have a capacity to meet requirements of thermal buffer capacity operation. Advantageously, the feed water heater (8) is coupled to the secondary space (11). In practical implementation a feed water heating system is configured to preheat make-up fluid introduced into the secondary space (11) at a maximum flow rate not less than 1.3 times the make-up fluid flow rate catering for the maximum continuous rated evaporative capacity of the Vessel (7) under normal operating conditions.

The feedwater heater (8) may advantageously incorporate features for simultaneous deaeration of the incoming make-up water in the feedwater heater (8) thereby serving both the functions of preheating and removing air and non-condensable gases from make-up fluid. Deaerated feed water avoids non-condensable gases interfering with thin film evaporation. Deaerated feed water inhibits scale formation that hinders heat transfer and further prevents corrosion of the internals and this allows the use of low cost construction material to fabricate the vessel (7). Deaeration of make-up water can be done separately and externally before it is introduced into the vessel (7).

A blow down circuit (24) facilitates blow down to control the amount of total dissolved solids (TDS) in the secondary space liquid of the vessel (7). The blowdown is drawn upstream from a location where the concentration of the total dissolved solids is highest. Heat in the blowdown water may be recovered through an indirect heat exchanger (27) by incoming make-up water.

Advantageously, a demister (12) is disposed in the secondary space interior at the steam outlet for delivery of steam to the downstream process to prevent liquid entrainment in the steam.

As shown in FIG. 4, advantageously an auxiliary steam condenser (9) is coupled with the said vessel (7). The auxiliary steam condenser (9) in fluid communication with the secondary space of the vessel (7) through conduit (15) condenses excess steam from the secondary space to regulate pressure in the secondary space to a set value during periods of excessive surplus process steam. The condensate from the auxiliary steam condenser (9) is returned to the secondary space of the vessel. The operating pressure of the auxiliary condenser which corresponds to the secondary steam pressure is contemplated at greater than ambient atmospheric pressure and not greater than about 680 kPa. The auxiliary steam condenser (9) is expected to come into operation when the internal thermal buffer capacity is unable to fully meet the requirement of the system to maintain stable process steam pressure. However, the auxiliary condenser should only be used sparingly to avoid wasting thermal energy. Accordingly, it is desirable to provide an induced direct air-cooled condensing plant that can accommodate the various operating criteria for power plant start-up or restart during a period of peak mechanical load or drastic reduction in thermal demand while achieving a reduction in the operating cost of the overall air-cooled auxiliary condensing plant. The capacity and performance of the auxiliary condenser depends on the configuration to meet user requirement.

The auxiliary steam condenser (9) which is of induced draft direct air-cooled design is constantly charged with steam from the secondary space of the vessel (7) to avoid atmospheric air ingress during standby and water hammer effects on start-up for providing reliable fast action when it is called upon to act. When the condenser fans are idle, conduction and natural draft convection heat dissipation from the auxiliary steam condenser (9) produces trickle condensation, which may be beneficially used to provide make-up water for the power circuit. The inherent natural draft and the induced air flow during standby duty of the auxiliary steam condenser (9) can be varied to produce variable quantity of condensate to meet the power circuit make-up service or any other use. An auxiliary steam condenser (9) of induced air flow direct air-cooled design offers advantage over water-cooled designs. Induced air-cooled design is configured for fast start-up without consuming electric power while on standby duty. Heat dispersion can be varied by varying induced air flow by means of variable speed drive fans, thus eliminating the need for flow control valve in the auxiliary condenser steam circuit.

The air-cooled auxiliary steam condenser (9) has at least one fan coupled to a variable-speed drive to regulate air flow which in turn regulates the steam pressure in the secondary space. The air-cooled auxiliary steam condenser (9) may be controlled by a combination of number of fans running and variable-speed drive fan. Air-cooled condensers having appropriate thermal characteristics relative to overall heat capacities enable the plant to meet discrepancies during periods of peak thermal loads.

A demister (12) is disposed in the secondary space interior at the steam outlet for delivery of steam to the auxiliary steam condenser (9) to prevent liquid entrainment in the steam to improve purity of its condensate when used as a source of make-up fluid for the power circuit or any other use.

Condensate from the auxiliary steam condenser (9) drains into a condensate collection vessel (14) from which any excess condensate overflows into the secondary space of the vessel (7) via conduit (19). The condensate collection vessel (14) provides a measure of buffer storage facility as well as minimum suction head for pumps. A level transmitter provides level signal for control purposes.

Figure 5:
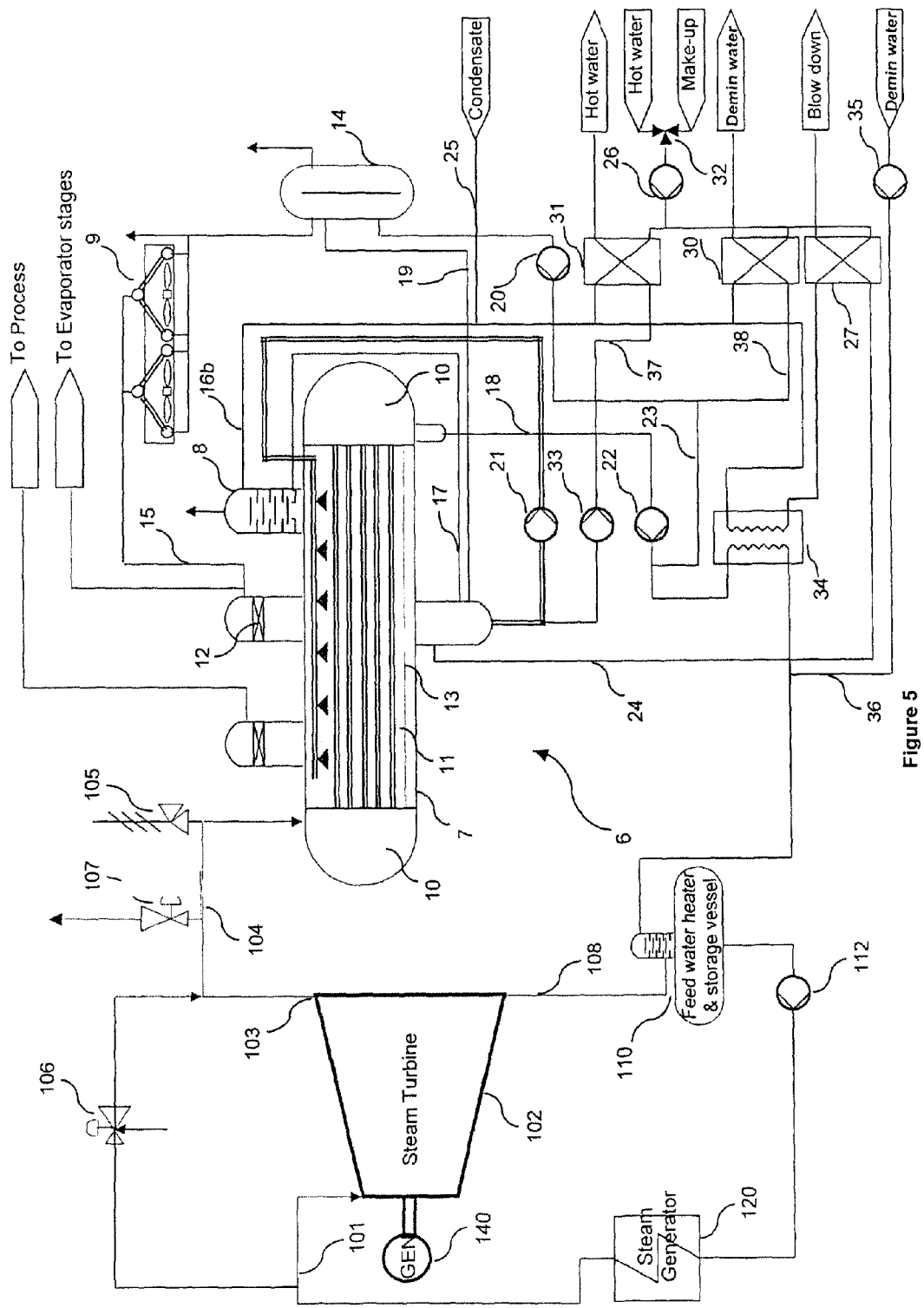
FIG. 5 shows an arrangement of a combined heat and power system used in a palm oil mill extraction plant in a fourth embodiment of the present invention.

Referring to FIG. 5, advantageously, condensate pump (20) conveys condensate from the condensate collection vessel (14) to the power circuit through conduit (23) for use as make-up fluid. Surplus condensate is conveyed via conduit (38) to a demineralised water storage tank for later use after it is cooled in an indirect heat exchanger (30) by incoming make-up water to recover heat. When in need, the stored demineralised water is admitted to the power circuit via pump (35) and conduit (36).

Referring to FIG. 5, advantageously regenerative feed heating can be provided to preheat the make-up water stream to recover heat from the power circuit condensate stream before the make-up water enters into the secondary space (11) of the vessel (7). The heat recovered in the make-up water allows for a reduction in the design internal evaporative thermal capacity required of the vessel (7) to meet a particular secondary steam output duty and thereby reducing costs. A regenerative heat exchanger (34) can be conveniently incorporated to exchange heat between the two fluid streams. The regenerative heat exchanger (34) operating at a higher mean temperature difference between the hot and cold fluid streams could provide an economical configuration in reducing the otherwise required evaporative capacity of the internal indirect heat exchanger of the vessel (7) that operates at a smaller constant temperature difference. However, it is to be recognised that such regenerative feed heating will have a negative impact on the design thermal buffer capacity of the vessel (7) to deal with rapid increase in thermal demand in terms of flow rate which depends on the temperature difference between the reserve hot water in vessel (7) and the incoming make-up water as the make-up water at steady state operation is now at a higher temperature. The effect of curtailing the flow of make-up water during deficit process steam periods will be to increase the temperature of the condensate in the power circuit exiting the regenerative heat exchanger (34). The consequence of this is a reduction in the heating steam drawn to the feed water heater (110) of the power circuit from the steam turbine (102) via conduit (108), which in turn discharges an additional flow of exhaust steam to the vessel (7). This will increase the differential temperature across the vessel heat exchanger (7), causing an undesirable pressure rise in the steam turbine exhaust steam. The net effect is delivering an additional steam to meet the deficit in process steam indirectly through heat exchange via the vessel (7) with undesirable results. The regenerative heat exchanger (34) will also affect the operation of external thermal energy storage in the event of an increase in thermal demand as it depends on the temperature difference between the externally stored hot water and the steady state make-up water. The reaction is similar to the negative impact on the design thermal buffer capacity of the vessel (7) causing an undesirable pressure rise in the steam turbine exhaust steam. The net effect is delivering the heat in the stored hot water to meet the deficit in process steam indirectly through heat exchange via the vessel (7) with undesirable results. For the above reasons, it is recommended that incorporating regenerative feed heating between the make-up water stream and the power circuit condensate stream is only considered as a possible retrofit to meet with future unplanned demand for additional process steam or to reconcile any design deficit, sacrificing the design thermal buffer capabilities. An approximately 15% increase in steaming capacity of the vessel (7) is achievable by such remedial regenerative feed heating based on typical CHP design operating thermal parameters.

Referring to FIG. 5, the embodiment advantageously incorporates an external thermal energy storage system. Surplus thermal energy is retrieved by withdrawing hot water from the vessel (7) via pump means or pump (33) through a hot water transfer conduit (37) and an indirect heat exchanger (31) to an external thermal energy storage facility and the same quantity of water, which is withdrawn in this way from the vessel replaced with cold make-up water through the make-up service via modulating flow diversion valve (32), make-up water pump (26), the indirect heat exchanger (31), and through conduit (16b) to the vessel (7). The hot water is withdrawn upstream from a location where the temperature is the highest corresponding to the saturation temperature. Where a feedwater heater (8) is provided, the heat exchange to the make-up water occurs in the feedwater heater (8) and the heated water is discharged at or below the water surface level in the secondary space, thus ensuring that the thin-film evaporation process is not affected by the temperatures or flow of incoming make-up water. Depending on the rate of thermal energy retrieved from the vessel (7) in terms of fraction of the evaporative capacity of the vessel (7), the make-up water flow rates and the corresponding capacity of feedwater heater (8), where provided, can be several times the normal duty. However, direct contact feedwater heating provides an economical means to achieve the heating. The indirect heat exchanger (31) cools the hot water to below boiling point before it is transferred to the storage reservoir facility to save energy that would otherwise be lost through flashing. Where a high temperature storage facility is employed, the indirect heat exchanger (31) may not be required. During periods of deficiency of thermal energy supply at peak thermal demands, hot water withdrawal via hot water transfer conduit (37) is stopped and instead hot water from the thermal energy storage facility in place of cold make-up water is supplied to the vessel (7) via modulating flow diverting valve (32).

Advantageously an external thermal energy storage system can be incorporated into the vessel plant (6, 7) with or without the internal thermal buffer capacity operational. However, the operation of external thermal energy storage requires the temperature of make-up water be lower than the externally stored hot water. Advantageously, where an internal thermal buffer capability is incorporated into the vessel plant (6, 7), the internal buffer capacity provides the rapid response for transient imbalance and reaction time for the activation of the external thermal energy storage system. The dead volume path that hot water from the external thermal energy storage passes through the make-up circuit before it enters the vessel (7) is a determining factor of the required reaction time.

Where it is advantageous, surplus thermal energy from the vessel (7) is withdrawn from the secondary space to vapour charge the external thermal energy storage facility. Where thermal energy load is cyclical diurnally or weekly on weekend turndowns, surplus heat can be stored and retrieved from the optionally coupled external thermal energy storage facility of an economic and not too large a storage capacity. However, external thermal energy storage that depends on hot water storage is only viable where the make-up fluid quantity is of considerable quantity and at low temperature, which is common in industrial heat and power plants. An example of a thermal energy storage facility is an insulated hot water storage tank. The tanks are well insulated and can store energy for up to a week. High-temperature storage like external phase-change material (PCM) based thermal energy storage can be readily incorporated in the future.

FIGS. 6.1, 6.2, 6.3 and 6.4 depict embodiments of the present invention in different configurations of combined heat and power plant incorporating a steam turbine where at least a portion of the exiting steam from the steam turbine is conveyed through the vessel arrangement to a downstream process. A straight backpressure steam turbine is shown in FIGS. 6.1 and 6.2. An extraction backpressure steam turbine is shown in FIGS. 6.3 and 6.4. It is uncommon that an extraction condensing steam turbine is used in an energy efficient combined heat and power plant, nevertheless the present invention can be beneficially incorporated on the extraction steam line. The objects of the disclosure can be harnessed in embodiments where without an intermediate steam turbine (102), a steam generator (120) supplies at least a portion of a downstream process steam that exhibits sustained cyclic demand through the vessel plant (7).

FIGS. 6.5, 6.6, 6.7 and 6.8 depict embodiments of the present invention in different configurations of combined heat and power plant incorporating a steam turbine where at least a portion of the exiting steam from the steam turbine is conveyed to a downstream process and a portion of it is diverted to a plant (5) to maintain stable pressure for the downstream process. A straight backpressure steam turbine is shown in FIGS. 6.5 and 6.6. An extraction backpressure steam turbine is shown in FIGS. 6.7 and 6.8. It is uncommon that an extraction condensing steam turbine is used in an energy efficient combined heat and power plant, nevertheless the present invention can be beneficially incorporated on the extraction steam line. The objects of the disclosure can be harnessed in embodiments where without an intermediate steam turbine (102), a steam generator (120) supplies a downstream process steam that exhibits sustained cyclic demand with plant (5) maintaining stable pressure for the downstream process.

Referring to FIG. 7a, there is indicated the possibility to circulate hot water from the secondary space (11) for high temperature hot water heating services. The hot water is withdrawn upstream from a location where the temperature is the highest corresponding to the saturation temperature by a pump means or pump (44) via conduit (45). After heat delivery, the water is returned to the secondary space. Such use of heat inevitably reduces the internal thermal buffer capacity to meet deficit thermal energy in terms of flow rates. An indirect heat exchanger (46) is optional.

Referring to FIG. 7b, there is indicated the possibility to incorporate an external heat sink to remove excess heat from the vessel by means like river water or cooling tower. The hot water is withdrawn upstream from a location where the temperature is the highest corresponding to the saturation temperature by a pump means or pump (47) via conduit (48). After heat delivery, the water is returned to the secondary space. An indirect heat exchanger (49) keeps the vessel circuit free of pollutants from the cooling source water. The removal of heat from the system should be used sparingly to avoid wasting thermal energy.

Referring to FIG. 7c, there is indicated the possibility to incorporate low grade waste heat recovery. Low grade waste heat is recovered in one or more heat exchangers (43) by the cold make-up water stream. Inevitably any heat recovery by the incoming make-up water before its admission into the secondary space reduces the thermal buffer capacity to meet deficit thermal energy in terms of flow rates unless such heat recovered is continuously removed from the system for storage in an external thermal storage system for a later beneficial use.

The incorporation of an external thermal energy storage system in the arrangement facilitates the recovery and upgrading of low-grade waste heat of temperatures higher than the make-up water stream from sources like process effluent cooling streams through heating the cold make-up water stream. The recovered heat is stored at higher temperature in the external thermal energy storage for later use when demand arises.

Advantageously, the make-up water quality for the secondary fluid should meet the requirement of a boiler make-up quality corresponding to the pressure in the secondary space. The minimum requirement will be to provide softened water after removing hardness causing substances like calcium and magnesium ions. The preferred water will be demineralised water from a single pass Reverse Osmosis plant. The chemical treatment regime for the secondary fluid will depend on the make-up water influent. Where a deaerating feedwater heater is not provided as part of the plant installation an external degassing facility like a mechanical deaerator or Membrane Contactors is used to remove non-condensable gases in the make-up water before it is introduced into the vessel (7).

The return of condensate from process heat circuits in industrial combined heat and power plants is usually low and therefore requires considerable quantities of cold make-up water for the purpose of replacing the losses, which in turn renders the temperature of the make-up water introduced into the vessel (7) low. Similar conditions arise in process plants where return of condensate is large but temperature of the return condensate low.

Advantageously, a surge tank in the process condensate return system will accumulate the process condensate when the inflow into vessel (7) is throttled.

A steam engine bypass pressure reducing and de-superheating station (106) may operate to:
 Provide process heat during periods when the thermal energy buffer capacity is not able to meet the process heat deficit. The maximum bypass flow rate can be predetermined;
 Allow safe boiler turndown in the event of steam engine trip; and
 Allow warming up steam flow conduits during plant start-up.

A quick acting pressure relief control valve (107) venting to the atmosphere through a noise attenuator advantageously provides rapid response to pressure rise during periods of excessive surplus process steam. The safety pressure relief device (105) opens when the steam pressure in the steam turbine exhaust rises above safe working pressure.

It is advantageously the case that a control system communicatively coupled to a flow controllable means located on the make-up circuit (16) regulates the flow of make-up fluid into the vessel (7) to operate its internal thermal buffer capacity in response to thermal energy imbalance. A pressure deviation from a predetermined set-point value of the vaporized secondary fluid can be a convenient measure of the thermal imbalance. A pressure deviation signal from a sensor sensing the vaporized secondary fluid pressure can be used as an input to the control system operable to selectively increase or decrease the flow of make-up fluid into the secondary space (11) of the vessel (7) in response to a positive or negative pressure deviation from a predetermined set-point pressure value respectively of the vaporized secondary fluid, in order to regulate the pressure of the vaporize secondary fluid, to maintain the pressure of the vaporized secondary fluid substantially at the set-point value. A "positive pressure deviation" denotes pressure greater than the predetermined set-point value.

The control system further comprising sensor for sensing the level of liquid surface in the secondary space of the vessel (7) includes a master level control operable to impress a signal on the steam turbine (102) governor or the make-up steam pressure reducing and desuperheating station (106) to selectively decrease or increase the input of primary steam into the primary space (10) of vessel (7) in response to a rising or falling liquid surface level in the secondary space (11) from a predetermined level value (13) respectively, in order to regulate the liquid surface level in the secondary space, wherein the rise or fall of liquid surface level from a predetermined level value (13) is gradually restrained. The master level control can be tuned loosely allowing the level to rise and fall in response to any short term imbalances. A non-linear control algorithm can be used to loose control the level in the secondary space, where the control responds to small errors with a small gain; it responds to large errors with a large gain. This means that in the vicinity of the set-point, the control allows the level to drift freely. The predetermined level set-point (13) is based on the operator's estimate of the nature of the downstream process load variations and whether the most probable thermal imbalance will require additional accumulation or depletion capacity of the confined reserve quantity of the secondary fluid in liquid phase in a heated state in the secondary space (11).

Advantageously, where external thermal energy storage is incorporated into the system in conjunction with the internal thermal buffer capacity, a control system maintains process steam pressure by activating the external thermal energy storage system to maintain process steam pressure and the liquid surface level in the secondary space (11) within the range defined by the high level and low level operating limits. Thus, during activation of the external thermal energy storage system, the control system increases the process steam flow by proportioning the make-up water flow with hot water from the external thermal energy storage by a modulating flow diversion valve when sensing a process steam deficit. Conversely the control system decreases the process steam flow by withdrawing hot water to the external thermal energy storage and replacing with an equal amount of cold make-up water when sensing a process steam surplus.

Where the vessel (7) operates on constant level control without activation of the internal thermal buffer capacity, a control system through a flow controllable means located on the make-up circuit (16) regulates the flow of make-up water into the vessel (7) to maintain a stable liquid surface level of the fluid in the secondary space (11) of the vessel.

Advantageously, where the vessel (7) operates on constant level control without activation of the internal thermal buffer capacity but coupled with an external thermal energy storage, a control system operates such that heat balance in the secondary space of the vessel (7) is regulated by means of varying the hot water flow in or out of the vessel (7) into the external storage system at a controllable rate. Surplus heat is retrieved and stored in the external thermal energy storage facility by withdrawing hot water from the secondary space (11) via hot water transfer conduit (37) and the level control replenishing the withdrawn water with cold make-up. Deficit heat is restored by proportioning the make-up water flow with hot water from the external thermal energy storage by modulating flow diversion valve (32). The regulation of hot water withdrawal can either be controlled by actuation of a combination of an ON-OFF valve on hot water transfer conduit (37) acting with a variable speed drive for the hot water transfer pump means or pump (33), or a combination of an ON-OFF valve acting with a flow controllable valve on the hot water conduits (37) to regulate the flow without the pump means or pump (33) where the vessel pressure is sufficient by itself to discharge the water to the external thermal energy storage.

The depiction of the steam turbine (102) is highly simplified and would in some cases comprise more than one inlet and outlet ports operating at different inlet and outlet steam pressures and temperatures. The steam turbine in some cases comprises more than one cylinder coupled together. The steam turbine in some cases may be single stage or multi-stage. The steam engine in some cases is a reciprocating steam engine.

While the present invention has been described as having a preferred design, it can be further modified within the spirit and the scope of this disclosure. This application is therefore intended to cover any variations, uses or adaptations of the invention using its general principles. Further, this application is intended to cover such departures from the present disclosure as come with a known or customer practice in the art to which this invention pertains.

While the preferred embodiments of the present invention have been shown and described herein, it will be obvious that such embodiments are provided by way of examples only. Numerous variations, changes and substitutions will occur to those of skill in the art without departing from the invention herein. Accordingly it is intended that the invention be limited only by the spirit and scope of the appended claims.

The invention claimed is:

1. A method of producing and utilizing thermal energy in a combined heat and power plant, said method comprising:
   a) generating a flow of steam in a steam generator (120) from a flow of feed water;
   b) directing at least a portion of the flow of steam from the steam generator (120) into a steam engine to produce mechanical power and discharging a flow of exhaust steam from the steam engine;
   c) directing either at least a portion of the flow of exhaust steam from the steam engine or a flow comprising a combination of the portion of the exhaust steam from the steam engine and a supplementary steam from the steam generator as process steam to provide thermal energy for a downstream process;
   d) in at least a vessel (7), wherein the vessel includes a primary space (10) and a secondary space (11) in heat communication with, but with fluid separation from each other, said secondary space containing a quantity of a secondary fluid in liquid phase:
      introducing the flow of process steam of step (c) into the primary space as a primary steam to vaporize the secondary fluid in liquid phase as a vaporized secondary fluid and resulting in precipitation of the primary steam as a primary condensate;
      simultaneously introducing the secondary fluid in liquid phase as make-u fluid into the secondary space; and
      directing the vaporized secondary fluid to impart thermal energy for the downstream process;
      whilst delivering the primary condensate from the primary space characterized in that the method further comprises:
   e) during periods of surplus vaporized secondary fluid, increasing a flow rate of introduction of the make-up fluid into the secondary space (11), thus reducing the surplus vaporized secondary fluid and accumulating a transitionally confined reserve quantity of the secondary fluid in liquid phase in a heated state in a reservoir space; and during periods of deficit vaporized secondary fluid, decreasing the flow rate of introduction of the make-up fluid into the secondary space, thus increasing the output of the vaporized secondary fluid and depleting the transitionally confined reserve quantity of the secondary fluid in liquid phase in a heated state in the reservoir space by continued vaporization, wherein a temperature of the make-up fluid introduced into the secondary space is lower than a temperature of the vaporized secondary fluid.

2. The method of producing and utilizing thermal energy in a combined heat and power plant according to claim 1, wherein the step of accumulating a transitionally confined reserve quantity of the secondary fluid in liquid phase in a heated state in a reservoir space occurs in a reservoir space provided in the secondary space (11).

3. The method of producing and utilizing thermal energy in a combined heat and power plant according to claim 1 further comprises: delivering the primary condensate of step (d) back to the steam generator (120) as a flow of feed water.

4. The method of producing and utilizing thermal energy in a combined heat and power plant according to claim 1, wherein the make-up fluid introduced into the secondary space does not comprise thermal energy gained from the primary condensate.

5. The method of producing and utilizing thermal energy in a combined heat and power plant according to claim 1, wherein the flow rate of the make-up fluid introduced into the secondary space (11) is not less than 1.3 times the flow rate of required make-up fluid flow for a maximum continuous rated evaporative capacity of the vessel (7).

6. The method of producing and utilizing thermal energy in a combined heat and power plant according to claim 1, wherein a pressure in the primary space (10) and a pressure in the secondary space (11) are greater than atmospheric pressure.

7. The method of producing and utilizing thermal energy in a combined heat and power plant according to claim 1, wherein the secondary fluid in the secondary space (11) is maintained at substantially constant pressure and temperature.

8. The method of producing and utilizing thermal energy in a combined heat and power plant according to claim 1, wherein the generation of the vaporized secondary fluid includes a thin-film evaporation process.

9. The method of producing and utilizing thermal energy in a combined heat and power plant according to claim 8, wherein the thin film evaporation process includes circulating the secondary fluid in the secondary space (11) by drawing the secondary fluid in liquid phase and discharging it on a surface heated by the primary stream.

10. The method of producing and utilizing thermal energy in a combined heat and power plant according to claim 1 further comprises: preheating the make-up fluid in at least one feed water heater (8) using the vaporized secondary fluid and subsequently discharging the preheated make-up fluid into the secondary space.

11. The method of producing and utilizing thermal energy in a combined heat and power plant according to claim 10, wherein the at least one feed water heater (8) preheats the makeup fluid introducible into the secondary space (11) to a temperature substantially equal to the temperature of the vaporised secondary fluid at a flow rate not less than 1.3 times the flow rate of the required make-up fluid flow for a maximum continuous rated evaporative capacity of the vessel (7).

12. The method of producing and utilizing thermal energy in a combined heat and power plant according to claim 10, wherein the at least one feed water heater (8) removes non-condensable gases from the make-up fluid and subsequently discharges the preheated make-up fluid into the secondary space (11).

13. The method of producing and utilizing thermal energy in a combined heat and power plant according to claim 1 further comprises:
   withdrawing at least a portion of the vaporized secondary fluid into an at least one auxiliary steam condenser (9) configured to precipitate the vaporized secondary fluid as a secondary condensate and discharging the secondary condensate into the secondary space (11), wherein a thermal energy in the secondary space is dispersed to the open.

14. The method of producing and utilizing thermal energy in a combined heat and power plant according to claim 13 further comprises:
drawing at least a portion of the secondary condensate from the auxiliary steam condenser; and
delivering the secondary condensate as a flow of feed water for the steam generator (120).

15. The method of producing and utilizing thermal energy in a combined heat and power plant according to claim 1 further comprises:
during periods of surplus vaporized secondary fluid, withdrawing hot secondary fluid in liquid phase from the secondary space (11) of vessel (7) to an external thermal energy storage facility; and replacing the same quantity of secondary fluid, which is withdrawn in this way with the make-up fluid into the secondary space (11), thus reducing a surplus thermal energy output from the secondary space; and
during periods of deficit vaporized secondary fluid, introducing a hot make-up fluid into the secondary space from the external thermal energy storage facility, thus reducing the deficit thermal energy output from the secondary space.

16. The method of producing and utilizing thermal energy in a combined heat and power plant according to claim 1 further comprises:
a) selectively increasing or decreasing the introduction of make-up fluid into the secondary space (11) of vessel (7) in response to a positive or negative pressure deviation from a predetermined set-point pressure respectively of the vaporized secondary fluid, in order to regulate the pressure of the vaporize secondary fluid, wherein the pressure of the vaporized secondary fluid is maintained substantially at the set-point pressure; and
b) selectively decreasing or increasing the input of primary steam into the primary space in response to a rising or falling liquid surface level in the secondary space from a predetermined surface level (13) respectively in order to regulate the liquid surface level in the secondary space, wherein the rise or fall of liquid surface level from a predetermined surface level (13) is gradually restrained.

17. The method of producing and utilizing thermal energy in a combined at and power plant according to claim 1 further comprises:
a) determining the flow rate (R1) of vaporized secondary fluid output from the secondary space (11) by measuring the flow rate (R2) of the primary steam flowing into the primary space (10); and
b) measuring the flow rate (R3) of make-up fluid flowing i e secondary space (11), wherein R1=a. R2−b. R3, where $a=(hg_0-hf_0)/(hg_1-hf_1)$;
$b=(hf_1-hf_2)/(hg_1-hf_1)$; and
$hg_0$=enthalpy of primary steam drawn into primary space;
$hf_0$=enthalpy of primary condensate discharged from primary space;
$hg_1$=enthalpy of secondary fluid in vapour state;
$hf_1$=enthalpy of secondary fluid in liquid state;
$hf_2$=enthalpy of make-up fluid.

18. An arrangement in a combined heat and power plant to produce and utilize thermal energy comprises:
a. a means to produce a flow of a generated steam from a flow of a feed water;
b. a means to receive at least a portion of the flow of the generated steam into a steam engine to produce a mechanical power and to discharge a flow of an exhaust steam from the steam engine;
c. a means to direct either at least a portion of the flow of the exhaust steam from the steam engine or a flow comprising a combination of the portion of the exhaust steam from the steam engine and a supplementary steam from a steam generator as a process steam to provide thermal energy to a downstream process;
d. at least a vessel (7) including a primary space (10) and a secondary space (11) in heat communication with, but with fluid separation from, each other, said secondary space containing a quantity of a secondary fluid in liquid phase,
the vessel (7) configured to receive the process steam into the primary space (10) as a primary steam which imparts a thermal energy to the secondary space (11) to vaporize the secondary fluid in liquid phase as a vaporized secondary fluid and resulting in precipitation of the primary steam as a primary condensate, and
the vessel (7) further includes a means of introducing the secondary fluid in liquid phase as make-up fluid into the secondary space (11), wherein said secondary fluid is vaporizable using the said imparted thermal energy in the secondary space (11), a means to output and direct any vaporized secondary fluid to the downstream process, and a means to withdraw the primary condensate, and a means to vary the flow rate of make-up fluid into the secondary space (11), characterized in that said means to vary the flow rate of make-up fluid into the secondary space (11) is configured such that during periods of surplus vaporized secondary fluid, the flow rate of the make-up fluid is increased, thus reducing the surplus vaporized secondary fluid and accumulating a transitionally confined reserve quantity of the secondary fluid in liquid phase in a heated state in a reservoir space; and such that during periods of deficit vaporized secondary fluid, the flow rate of the make-up fluid is reduced, thus increasing the output of the vaporized secondary fluid and depleting the transitionally confined reserve quantity of the secondary fluid in liquid phase in a heated state in the reservoir space by continued vaporization.

19. The arrangement in a combined heat and power plant to produce and utilize thermal energy according to claim 18, wherein the secondary space (11) includes the reservoir space to accumulate the transitionally confined reserve quantity of the secondary fluid in liquid phase.

20. The arrangement in a combined heat and power plant to produce and utilize thermal energy according to claim 18, wherein said arrangement further includes a means to deliver the withdrawn primary condensate as a flow of feed water for steam generation.

21. The arrangement in a combined heat and power plant to produce and utilize thermal energy according to claim 18, wherein the arrangement does not comprise a means configured to transfer thermal energy from the primary condensate to the makeup fluid prior to the make-up fluid being introduced into the secondary space.

22. The arrangement in a combined heat and power plant to produce and utilize thermal energy according to claim 18, wherein the arrangement is configured such that the maximum possible flow rate of the make-up fluid into the secondary space (11) is not less than 1.3 times the flow rate of required make-up fluid flow for a maximum continuous rated evaporative capacity of the vessel (7).

23. The arrangement in a combined heat and power plant to produce and utilize thermal energy according to claim 18, wherein the vessel (7) includes a means for a thin-film evaporative process for vaporization of the secondary fluid.

24. The arrangement in a combined heat and power plant to produce and utilize thermal energy according to claim 23, wherein the means for the thin film evaporative process includes a plurality of tubes through which tubes the primary steam is flowable, wherein secondary fluid in liquid phase is introducible over the external surface of the tubes.

25. The arrangement in a combined heat and power plant to produce and utilize thermal energy according to claim 18 further comprises at least one feed water heater (8) coupled in fluid communication with the secondary space (11) of the at least one vessel (7) and configured to preheat the make-up fluid using at least a portion of the vaporized secondary fluid and subsequently to discharge the preheated make-up secondary fluid into the secondary space (11).

26. The arrangement in a combined heat and power plant to produce and utilize thermal energy according to claim 25, wherein the at least one feed water heater (8) is configured to preheat make-up fluid introducible into the secondary space (11) to a temperature substantially equal to the temperature of the vaporised secondary fluid at a maximum flow rate not less than 1.3 times the flow rate of required make-up fluid flow for the maximum continuous rated evaporative capacity of the vessel (7).

27. The arrangement in a combined heat and power plant to produce and utilize thermal energy according to claim 25, wherein the at least one feed water heater (8) is configured to remove non-condensable gases from the make-up fluid and subsequently to discharge the preheated make-up fluid into the secondary space (11).

28. The arrangement in a combined heat and power plant to produce and utilize thermal energy according to claim 18 further comprises a means configured to withdraw at least a portion of the vaporized secondary fluid into an at least one auxiliary steam condenser (9) configured to precipitate the vaporized secondary fluid as a secondary condensate and a means configured to discharge the secondary condensate into the secondary space (11), wherein a thermal energy in the secondary space is dispersed to the open.

29. The arrangement in a combined heat and power plant to produce and utilize thermal energy according to claim 28 further comprises a means configured to withdraw at least a portion of the secondary condensate from the auxiliary steam condenser (9), and a means configured to deliver the secondary condensate as a flow of feed water for the steam generator (120).

30. The arrangement in a combined heat and power plant to produce and utilize thermal energy according to claim 18 further comprises a means configured to draw a hot secondary fluid in liquid phase from the secondary space (11) of vessel (7) to an external thermal energy storage facility; and a means configured to replace the same quantity of secondary fluid, which is withdrawn in this way with make-up fluid into the secondary space during periods of surplus vaporized secondary fluid, and a means configured to introduce hot make-up fluid into the secondary space from the external thermal energy storage facility during periods of deficit vaporized secondary fluid.

31. The arrangement in a combined heat and power plant to produce and utilize thermal energy according to claim 19, further comprising:
a) control system comprising at least a sensor for sensing the pressure of the vaporized secondary fluid communicatively coupled to a flow controllable means located on a make-up fluid introducible circuit and operable to selectively increase or decrease the introduction of make-up fluid into the secondary space in response to a positive or negative pressure deviation from a predetermined set-point pressure respectively of the vaporized secondary fluid, in order to regulate the pressure of the vaporized secondary fluid to maintain it substantially at set-point pressure; and
b) the control system further comprising at least a sensor for sensing the level of secondary fluid liquid surface and further operable to selectively decrease or increase the input of primary steam into the primary space (10) of vessel (7) in response to a rise or fall of liquid surface level in the secondary space (11) from a predetermined surface level (13) respectively in order to regulate the liquid surface level in the secondary space, wherein the rise or fall of liquid surface level from a predetermined surface level (13) is gradually restrained.

32. The arrangement in a combined heat and power plant to produce and utilize thermal energy according to claim 18, further comprising:
a microprocessor in which a signal denoting the flow rate (R1) of the vaporized secondary fluid output flow from the secondary space (11) is shown as output wherein a signal denoting the flow rate (R2) of the primary steam flow into the primary space (10) and a signal denoting the flow rate (R3) of the make-up fluid flow into the secondary space (11) which signals are input into the microprocessor, wherein R1 is computed from the formula: R1=a. R2−b. R3,
where a=(hg$_0$-hf$_0$)/(hg$_1$-hf$_1$);
b=(hf$_1$-hf$_2$)/(hg$_1$-hf$_1$); and
hg$_0$=enthalpy of primary steam drawn into primary space;
hf$_0$=enthalpy of primary condensate discharged from primary space;
hg$_1$=enthalpy of secondary fluid in vapour state;
hf$_1$=enthalpy of secondary fluid in liquid state;
hf$_2$=enthalpy of make-up fluid.

33. A vessel (7) for fluid separation and providing thermal energy buffer capacity, wherein said vessel comprises a primal space (10) and a secondary space (11) in heat communication with, but with fluid separation from, each other, said secondary space configured to contain a quantity of a secondary fluid in liquid phase, the vessel (7) configured to receive a flow of steam into the primary space (10) as a primary steam which imparts a thermal energy to the secondary space (11) resulting in precipitation of the primary steam as a primary condensate, and the vessel (7) is further configured to receive a flow of the secondary fluid in liquid phase as make-up fluid into the secondary space (11), wherein the secondary fluid is vaporizable using the said imparted thermal energy in the secondary space (11), output and direct any vaporized secondary fluid to a downstream process, and withdraw the primary condensate, characterized in that the vessel (7) further includes at least one feed water heater (8) coupled in fluid communication with the secondary space (11) of the vessel (7) and configured to preheat the make-up fluid using at least a portion of the vaporized secondary fluid and to subsequently discharge the preheated make-up secondary fluid into the secondary space (11), wherein the at least one feed water heater (8) is configured to preheat nmke-up fluid introducible into the secondary space (11) to a temperature substantially equal to the temperature of the vaporised secondary fluid at a maximum flow rate not less than 1.3 times the flow rate of required make-up fluid flow for the maximum continuous rated evaporative capacity of the vessel (7).

34. The vessel (7) according to claim 33, wherein:
a) the secondary space (11) comprises a reservoir space to accumulate a transitionally confined reserve quantity of the secondary fluid in liquid phase; and
b) a means to introduce and vary the flow rate of make-up fluid into the secondary space (11) is provided, wherein said means is configured such that, during periods of increasing pressure in the secondary space, the flow rate of the make-up fluid is increased, thus reducing the output of the vaporized secondary fluid and accumulating a transitionally confined reserve quantity of the secondary fluid in liquid phase in a heated state in the reservoir space; and during periods of decreasing pressure in the secondary space, the flow rate of the make-up fluid is reduced, thus increasing the output of the vaporized secondary fluid and depleting the transitionally confined reserve quantity of the secondary fluid in liquid phase in a heated state in the reservoir space by continued vaporization.

35. The vessel (7) according to claim 33, wherein the vessel is configured such that the maximum possible make-up flow rate of the make-up fluid into the secondary space (11) is not less than 1.3 times the flow rate of required make-up fluid for the maximum continuous rated evaporative capacity of the vessel (7).

36. The vessel (7) according to claim 33, wherein the vessel (7) comprises a means for a thin-film evaporative process for vaporization of said secondary fluid.

37. The vessel (7) according to claim 36, wherein the means for the thin-film evaporative process comprises a plurality of tubes through which tubes the primary steam is flowable, wherein secondary fluid in liquid phase is introducible over the external surface of the tubes.

38. The vessel (7) according to claim 33, wherein the at least one feed water heater (8) is configured to remove non-condensable gases from the make-up fluid and subsequently to discharge the preheated make-up fluid into the secondary space (11).

39. The vessel (7) according to claim 33, wherein the vessel (7) further comprises a means configured to draw hot secondary fluid in liquid phase from the secondary space (11) of vessel (7) to an external thermal energy storage facility; and a means configured to replace the same quantity of secondary fluid which is withdrawn in this way with makeup fluid into the secondary space during periods of increasing pressure in the secondary space, and a means configured to introduce hot make-up fluid into the secondary space from the external thermal energy storage facility during periods of decreasing pressure in the secondary space.

40. The vessel (7) according to claim 34, wherein the vessel (7) further comprises:
a) a control system comprising at least a sensor for sensing the pressure of the vaporised secondary fluid communicatively coupled to a flow controllable means located on a make-up fluid introducible circuit and operable to selectively increase or decrease the introduction of make-up fluid into the secondary space (11) in response to a positive or negative pressure deviation from a predetermined set-point pressure respectively of the vaporized secondary fluid, in order to regulate the pressure of the vaporized secondary fluid to maintain it substantially at set-point pressure; and
b) the control system further comprising at least a sensor for sensing the level of secondary fluid liquid surface and further operable to selectively decrease or increase the input of primary steam into the primary space (10) of vessel (7) in response to a rise or fall of liquid surface level in the secondary space (11) from a predetermined surface level (13) respectively in order to regulate the liquid surface level in the secondary space, wherein the rise or fall of liquid surface level from a predetermined surface level (13) is gradually restrained.

41. The vessel (7) according to claim 33, wherein the vessel (7) further comprises:
a microprocessor in which a signal denoting the flow rate (R1) of the vaporized secondary fluid output flow from the secondary space (11) is shown as output wherein a signal denoting the flow rate (R2) of the primary steam flow into the primary space (10) and a signal denoting the flow rate (R3) of the make-up fluid flow into the secondary space (11) which signals are input into the microprocessor, wherein R1 is computed from the formula: R1=a. R2–b. R3,
where $a=(hg_0-hf_0)/(hg_1-hf_1)$;
$b=(hf_1-hf_2)/(hg_1-hf_1)$; and
$hg_0$=enthalpy of primary steam drawn into primary space;
$hf_0$=enthalpy of primary condensate discharged from primary space;
$hg_1$=enthalpy of secondary fluid in vapour state;
$hf_1$=enthalpy of secondary fluid in liquid state;
$hf_2$=enthalpy of make-up fluid.

42. A method of producing and utilizing thermal energy in a combined heat and power plant comprises:
a) generating a flow of steam in a steam generator (120) from a flow of feed water;
b) directing at least a portion of the flow of steam from the steam generator (120) into a steam engine to produce mechanical power and discharging exhaust steam from the steam engine;
c) directing either at least a portion of the flow of exhaust steam from the steam engine or a flow comprising a combination of the portion of the exhaust steam from the steam engine and a supplementary steam from a steam generator as a process steam for a downstream process;
d) directing the portion of the exhaust steam as heating steam for heating a make-up water introducible into at least one storage vessel (60), confining the heated make-up water transitionally in the at least one storage vessel (60), removing the confined hot water from the storage vessel (60) and applying the hot water for a beneficial use; and wherein a temperature of the make-up water introduced into the storage vessel (60) is lower than the saturation temperature of the exhaust steam used for heating the make-up water characterised in that the method further comprises:
e) during periods of surplus process steam in step (c), increasing a flow rate of introduction of the makeup water for heating, thus reducing the surplus process steam and accumulating a transitionally confined reserve quantity of the hot water; and during periods of deficit process steam in step (c), reducing the flow rate of introduction of the make-up water for heating, thus reducing the deficit process steam and depleting the transitionally confined reserve quantity of the hot water by continuing to supply a flow of hot water for the beneficial use.

43. The method of producing and utilizing thermal energy in a combined heat and power plant according to claim 42, wherein the transitionally confined reserve quantity of the hot water is accumulated within the storage vessel (60).

44. The method of producing and utilizing thermal energy in a combined heat and power plant according to claim 42, wherein the hot water is heated and maintained at substantially constant pressure and temperature.

45. The method of producing and utilizing thermal energy in a combined heat and power plant according to claim 42, wherein the hot water is heated to a temperature substantially equal to the saturation temperature of the exhaust steam directed for heating the make-up water.

46. The method of producing and utilizing thermal energy in a combined heat and power plant according to claim 42, wherein the process steam is used for heating the make-up water.

47. The method of producing and utilizing thermal energy in a combined heat and power plant according to claim 42, wherein the beneficial use comprises flow of feed water to the steam generator (120).

48. The method of producing and utilizing thermal energy in a combined heat and power plant according to claim 42, wherein the flow rate of the make-up water into the storage vessel (60) is not less than 1.3 times the flow rate of required make-up water flow for a maximum continuous rated supply of hot water for the beneficial use.

49. The method of producing and utilizing thermal energy in a combined heat and power plant according to claim 42 further comprises: preheating the make-up water in at least one feed water heater (70) coupled in fluid communication with the at least one storage vessel (60) using the heating steam and subsequently discharging the preheated make-up water into the storage vessel (60).

50. The method of producing and utilizing thermal energy in a combined heat and power plant according to claim 49, wherein the at least one feed water heater (70) preheats the make-up water to a temperature substantially equal to saturation temperature of the heating steam at a flow rate not less than 1.3 times the flow rate of required make-up water flow for a maximum continuous rated supply of hot water for the beneficial use.

51. The method of producing and utilizing thermal energy in a combined heat and power plant according to claim 49, wherein the at least one feed water heater (70) removes non-condensable gases from the make-up water and subsequently discharges the treated make-up water into the storage vessel (60).

52. The method of producing and utilizing thermal energy in a combined heat and power plant according to claim 42 further comprises:
  during periods of surplus process steam, withdrawing hot water from the storage vessel (60) to an external thermal energy storage facility; and replacing the same quantity of water which is withdrawn in this way with make-up water into the feed water heater (70), thus reducing the surplus process steam; and
  during periods of deficit process steam, introducing hot make-up water into the feed water heater (70) from the external thermal energy storage facility, thus reducing the deficit process steam.

53. The method of producing and utilizing thermal energy in a combined heat and power plant according to claim 43 further comprises:
  a) selectively increasing or decreasing the introduction of make-up water for heating into the storage vessel (60) in response to a positive or negative pressure deviation from a predetermined set-point pressure respectively of process steam, in order to regulate the pressure of process steam, wherein the pressure of the process steam is maintained substantially at the set-point pressure; and
  b) selectively decreasing or increasing the output of process steam in step (c) to the downstream process in response to a rising or falling liquid surface level in the storage vessel (60) from a predetermined surface level (61) respectively, in order to regulate the liquid surface level, wherein the rise or fall of liquid surface level in the storage vessel from a predetermined surface level (13) is gradually restrained.

54. The method of producing and utilizing thermal energy in a combined heat and power plant according to claim 42 further comprising:
  a) determining the flow rate (R1) of process steam to a downstream process by measuring the flow rate (R2) of flow of exhaust steam; and
  b) measuring the flow rate (R3) of flow rate of make-up water into the storage vessel (60), wherein R1=R2−a. R3,
  where $a=(hf_1-hf_2)/(hg_0-hf_1)$; and
  $hg_0$=enthalpy of a flow exhaust steam;
  $hf_1$=enthalpy of heated water in storage vessel (60);
  $hf_2$=enthalpy of make-up water.

55. An arrangement in a combined heat and power plant to produce and utilize thermal energy comprising:
  a means to produce a flow of steam in a steam generator (120) from a flow of feed water;
  a means to receive the flow of steam into a steam engine (102) to produce mechanical power and to discharge a flow of an exhaust steam from the steam engine;
  a means to direct either at least a portion of the flow of exhaust steam from the steam engine or a flow comprising a combination of the portion of the exhaust steam from the steam engine and a supplementary steam from the steam generator as a process steam for a downstream process; and
  a means to direct a portion of the exhaust steam as heating steam for heating a make-up water introducible into at least one storage vessel (60),to confine the heated make-up water transitionally in the at least one storage vessel (60), to remove the confined hot water from the storage vessel (60) and to apply the hot water for a beneficial use;
  wherein a temperature of the make-up water introduced into the storage vessel (60) is lower than the saturation temperature of the heating steam used for heating the make-up water, and a means to vary the flow rate of make-up water into the storage vessel (60) is provided, characterized in that said means to vary the flow rate of make-up water into the storage vessel (60) is configured such that, during periods of surplus process steam, a flow rate of the makeup water is increased, thus reducing the output of the process steam and accumulating a transitionally confined reserve quantity of the hot water; and during periods of deficit process steam, the flow rate of the make-up water is reduced, thus increasing the output of the process steam and depleting the transitionally confined reserve quantity of the hot water by continuing to supply a flow of hot water for the beneficial use.

56. The arrangement in a combined heat and power plant to produce and utilize thermal energy according to claim 55, wherein the storage vessel (60) is configured to accumulate the transitionally confined reserve quantity of the hot water.

57. The arrangement in a combined heat and power plant to produce and utilize thermal energy according to claim 55, wherein said arrangement is configured such that the maximum possible flow rate of the make-up water is not less than 1.3 times the flow rate of required make-up fluid flow for a maximum continuous supply of hot water for the beneficial use.

58. The arrangement in a combined heat and power plant to produce and utilize thermal energy according to claim 55, wherein said arrangement is configured to heat and maintain the hot water at substantially constant pressure and temperature.

59. The arrangement in a combined heat and power plant to produce and utilize thermal energy according to claim 55, wherein said arrangement is configured such that the heating steam is supplied from the process steam.

60. The arrangement in a combined heat and power plant to produce and utilize thermal energy according to claim 55, wherein said arrangement is configured such that the hot water is heated to a temperature substantially equal to saturation temperature of the exhaust steam directed as heating steam.

61. The arrangement in a combined heat and power plant to produce and utilize thermal energy according to claim 55, wherein said arrangement is configured such that the beneficial use comprises flow of feed water to the steam generator (120).

62. The arrangement in a combined heat and power plant to produce and utilize thermal energy according to claim 55, wherein said arrangement further includes at least one feed water heater (70) coupled in fluid communication with the at least one storage vessel (60) and configured to preheat the make-up water using heating steam and subsequently discharge the preheated make-up water into the storage vessel (60).

63. The arrangement in a combined heat and power plant to produce and utilize thermal energy according to claim 62, wherein the at least one feed water heater (70) is configured to preheat the make-up water to a temperature substantially equal to saturation temperature of the heating steam at a maximum flow rate not less than 1.3 times the flow rate of required make-up water flow for a maximum continuous rated supply of hot water for the beneficial use.

64. The arrangement in a combined heat and power plant to produce and utilize thermal energy according to claim 62, wherein the at least one feed water heater (70) is configured to remove non-condensable gases from the make-up water and subsequently discharge the treated make-up water into the storage vessel (60).

65. The arrangement in a combined heat and power plant to produce and utilize thermal energy according to claim 55, wherein said arrangement further includes a means configured to withdraw hat water from the storage vessel (60) to an external thermal energy storage facility; and a means configured to replace the same quantity of water, which is withdrawn in this way with make-up water into the feed water heater (70) during periods of surplus process steam, and a means configured to introduce hot makeup water into the feed water heater (70) from the external thermal energy storage facility during periods of deficit process steam.

66. The arrangement in a combined heat and power plant to produce and utilize thermal energy according to claim 56, wherein said arrangement further includes:
   a) a control system comprising at least a sensor for sensing the pressure of the process steam which sensor is communicatively coupled to a flow controllable means located on a make-up circuit and operable to selectively increase or decrease the introduction of make-up water for heating into the storage vessel (60) in response to a positive or negative pressure deviation from a predetermined set-point pressure respectively of the process steam, in order to regulate the pressure of the process steam, wherein the pressure of the process steam is maintained substantially at the set-point pressure; and
   b.) the control system further includes at least a sensor for sensing the level of hot water in the storage vessel (60) and is operable to selectively decrease or increase the output of process steam to the downstream process in response to a rise or fall of hot water surface level in the storage vessel (60) from a predetermined surface level respectively, in order to regulate the hot water surface level, wherein the rise or fall of hot water surface level in the storage vessel from a predetermined surface level is gradually restrained.

67. The arrangement in a combined heat and power plant to produce and utilize thermal energy according to claim 55, Wherein said arrangement further includes:
   a microprocessor in which a signal denotes the flow rate ($R1$) of the process to a. downstream process is shown as output Wherein a signal denoting the flow rate ($R2$) of the flow of exhaust steam discharged by the steam engine and a signal denoting the flow rate ($R3$) of flow of make-up rate into the storage vessel (60) which signals are input into the microprocessor, wherein $R1$ is computed from the formula: $R1=R2-a \cdot R3$,
   where $a=(hf_1-hf_2)/(hg_0-hf_1)$; and
   $hg_0$=enthalpy of a flow exhaust steam;
   $hf_1$=enthalpy of heated water in storage vessel (60);
   $hf_2$=enthalpy of make-up water.

* * * * *